US012045433B2

(12) United States Patent
Roos

(10) Patent No.: US 12,045,433 B2
(45) Date of Patent: *Jul. 23, 2024

(54) AUDIO-VISUAL NAVIGATION AND COMMUNICATION DYNAMIC MEMORY ARCHITECTURES

(71) Applicant: AQ MEDIA, INC., Marco Island, FL (US)

(72) Inventor: Jan Peter Roos, Marco Island, FL (US)

(73) Assignee: AQ MEDIA, INC., Marco Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,535

(22) Filed: Jun. 30, 2023

(65) Prior Publication Data

US 2023/0359322 A1 Nov. 9, 2023

Related U.S. Application Data

(63) Continuation of application No. 17/812,080, filed on Jul. 12, 2022, now Pat. No. 11,698,709, which is a
(Continued)

(51) Int. Cl.
*G06F 3/04815* (2022.01)
*G06F 3/0482* (2013.01)
(Continued)

(52) U.S. Cl.
CPC ........ *G06F 3/04815* (2013.01); *G06F 3/0482* (2013.01); *G06F 3/04842* (2013.01);
(Continued)

(58) Field of Classification Search
CPC ................................. G06F 3/048–05
See application file for complete search history.

(56) References Cited

U.S. PATENT DOCUMENTS

| 5,524,195 A | 6/1996 | Clanton, III et al. |
| 5,557,724 A | 9/1996 | Sampat et al. |

(Continued)

FOREIGN PATENT DOCUMENTS

| KR | 2010-0091161 | 8/2010 |
| WO | WO 01/52077 | 7/2001 |
| WO | WO 2005/013148 | 2/2005 |

OTHER PUBLICATIONS

Adobe Media Player, "New Ways to Distribute and Experience Music Videos," 2008.
(Continued)

*Primary Examiner* — Daniel Rodriguez
(74) *Attorney, Agent, or Firm* — King & Spalding LLP

(57) ABSTRACT

According to one embodiment, a plurality of spatial publishing objects (SPOs) is provided in a multidimensional space in a user interface. Each of the plurality of spatial publishing objects is associated with digital media data from at least one digital media source. The user interface has a field for the digital media data. A user is provided via the user interface with a user presence that is optionally capable of being represented in the user interface relative to the plurality of spatial publishing objects. The digital media data associated with the at least one spatial publishing object are combined to generate a media output corresponding to the combined digital media data.

20 Claims, 15 Drawing Sheets

Related U.S. Application Data continuation of application No. 17/342,854, filed on Jun. 9, 2021, now Pat. No. 11,397,510, which is a continuation of application No. 16/823,761, filed on Mar. 19, 2020, now Pat. No. 11,054,966, which is a continuation of application No. 16/208,287, filed on Dec. 3, 2018, now Pat. No. 10,599,285, which is a continuation of application No. 15/200,877, filed on Jul. 1, 2016, now Pat. No. 10,146,399, which is a continuation of application No. 13/607,410, filed on Sep. 7, 2012, now Pat. No. 9,405,503, which is a continuation of application No. 12/861,698, filed on Aug. 23, 2010, now Pat. No. 8,291,049, which is a continuation of application No. 12/239,333, filed on Sep. 26, 2008, now Pat. No. 7,797,402.

(60) Provisional application No. 60/995,353, filed on Sep. 26, 2007.

(51) Int. Cl.

| | | |
|---|---|---|
| *G06F 3/04842* | (2022.01) | |
| *G06F 3/04845* | (2022.01) | |
| *G06F 3/14* | (2006.01) | |
| *G06F 3/16* | (2006.01) | |
| *G06F 15/16* | (2006.01) | |
| *G06Q 30/0273* | (2023.01) | |
| *G06Q 30/08* | (2012.01) | |
| *G06T 13/20* | (2011.01) | |
| *G06T 17/00* | (2006.01) | |
| *G06T 19/00* | (2011.01) | |
| *H04N 21/2187* | (2011.01) | |
| *H04N 21/431* | (2011.01) | |
| *H04N 21/472* | (2011.01) | |
| *H04N 21/81* | (2011.01) | |

(52) U.S. Cl.
CPC ........ *G06F 3/04845* (2013.01); *G06F 3/1454* (2013.01); *G06F 3/162* (2013.01); *G06F 3/165* (2013.01); *G06F 3/167* (2013.01); *G06F 15/16* (2013.01); *G06Q 30/0273* (2013.01); *G06Q 30/08* (2013.01); *G06T 13/20* (2013.01); *G06T 17/00* (2013.01); *G06T 19/003* (2013.01); *H04N 21/2187* (2013.01); *H04N 21/4312* (2013.01); *H04N 21/47202* (2013.01); *H04N 21/812* (2013.01)

(56) References Cited

U.S. PATENT DOCUMENTS

| | | | |
|---|---|---|---|
| 5,689,669 A | 11/1997 | Lynch | |
| 5,729,471 A | 3/1998 | Jain et al. | |
| 5,736,982 A * | 4/1998 | Suzuki | H04N 7/15 715/848 |
| 5,831,518 A | 11/1998 | Nagahara et al. | |
| 5,850,352 A | 12/1998 | Moezzi et al. | |
| 5,999,185 A * | 12/1999 | Kato | G06F 3/04815 345/473 |
| 6,005,548 A | 12/1999 | Latypov et al. | |
| 6,054,989 A * | 4/2000 | Robertson | G06F 3/04815 715/848 |
| 6,121,969 A * | 9/2000 | Jain | G06F 16/54 715/850 |
| 6,160,553 A * | 12/2000 | Robertson | G06F 3/04815 715/848 |
| 6,166,727 A | 12/2000 | Kozuka | |
| 6,166,738 A * | 12/2000 | Robertson | G06F 3/04815 715/848 |
| 6,188,405 B1 * | 2/2001 | Czerwinski | G06F 3/0481 715/764 |
| 6,199,076 B1 * | 3/2001 | Logan | H04N 21/6582 434/319 |
| 6,243,093 B1 * | 6/2001 | Czerwinski | G06F 16/907 715/848 |
| 6,253,218 B1 | 8/2001 | Aoki et al. | |
| 6,323,857 B1 * | 11/2001 | Mielekamp | H04N 7/15 345/475 |
| 6,329,986 B1 | 12/2001 | Cheng | |
| 6,359,636 B1 | 3/2002 | Schindler et al. | |
| 6,408,128 B1 * | 6/2002 | Abecassis | G11B 27/034 348/E7.071 |
| 6,414,677 B1 * | 7/2002 | Robertson | G06F 3/04815 715/848 |
| 6,428,449 B1 * | 8/2002 | Apseloff | A63B 71/0622 482/3 |
| 6,456,973 B1 * | 9/2002 | Fado | G10L 13/00 704/270 |
| 6,476,830 B1 * | 11/2002 | Farmer | G06Q 30/0641 715/977 |
| 6,560,636 B2 | 5/2003 | Cohen et al. | |
| 6,651,251 B1 | 11/2003 | Shoff et al. | |
| 6,693,652 B1 | 2/2004 | Barrus | |
| 6,772,195 B1 * | 8/2004 | Hatlelid | G06F 3/04815 709/224 |
| 6,772,393 B1 | 8/2004 | Estrada | |
| 6,995,759 B1 * | 2/2006 | Gallery | G06F 3/04815 345/428 |
| 7,006,616 B1 * | 2/2006 | Christofferson | H04L 65/103 379/202.01 |
| 7,086,005 B1 | 8/2006 | Matsuda | |
| 7,181,438 B1 | 2/2007 | Szabo | |
| 7,194,753 B1 | 3/2007 | Fries et al. | |
| 7,289,132 B1 | 10/2007 | Reid et al. | |
| 7,343,278 B2 | 3/2008 | Billinghurst et al. | |
| 7,380,280 B2 | 5/2008 | Billmaier et al. | |
| 7,386,806 B2 | 6/2008 | Wroblewski | |
| 7,746,343 B1 * | 6/2010 | Charaniya | G06N 7/01 345/428 |
| 7,747,957 B2 | 6/2010 | Masuda | |
| 8,627,213 B1 * | 1/2014 | Jouppi | H04M 3/568 715/848 |
| 9,823,809 B2 * | 11/2017 | Roos | G06F 3/04815 |
| 10,146,399 B2 | 12/2018 | Roos | G06T 17/00 |
| 10,664,126 B2 * | 5/2020 | Roos | G06T 13/20 |
| 11,698,709 B2 * | 7/2023 | Roos | G06F 3/0482 715/206 |
| 2001/0033675 A1 | 10/2001 | Maurer | |
| 2001/0044725 A1 * | 11/2001 | Matsuda | G10L 13/033 704/270.1 |
| 2001/0055398 A1 * | 12/2001 | Pachet | G10K 15/00 381/98 |
| 2002/0080173 A1 | 8/2002 | Tagami | |
| 2002/0109719 A1 * | 8/2002 | Hata | G10L 13/00 704/E13.008 |
| 2002/0147729 A1 | 10/2002 | Balfour | |
| 2002/0151996 A1 * | 10/2002 | Wilcock | G06F 3/167 381/61 |
| 2002/0186284 A1 | 12/2002 | Berquist et al. | |
| 2003/0046695 A1 | 3/2003 | Billmaier et al. | |
| 2003/0063133 A1 * | 4/2003 | Foote | G06F 16/29 715/850 |
| 2003/0151592 A1 * | 8/2003 | Ritter | G01C 21/3682 345/156 |
| 2004/0030741 A1 | 2/2004 | Wolton et al. | |
| 2004/0036721 A1 | 2/2004 | Anderson et al. | |
| 2004/0039583 A1 | 2/2004 | Saito | |
| 2004/0085258 A1 | 5/2004 | Piccionelli | |
| 2004/0135820 A1 | 7/2004 | Deaton et al. | |
| 2004/0168132 A1 * | 8/2004 | Travieso | G06F 16/95 715/201 |
| 2004/0168172 A1 | 8/2004 | Masuda | |
| 2004/0172593 A1 * | 9/2004 | Wong | G06F 16/40 715/201 |
| 2004/0193441 A1 | 9/2004 | Altieri | |
| 2004/0252120 A1 | 12/2004 | Hunleth et al. | |
| 2004/0268393 A1 | 12/2004 | Hunleth et al. | |
| 2005/0005241 A1 | 1/2005 | Hunleth et al. | |

(56) References Cited

U.S. PATENT DOCUMENTS

| | | |
|---|---|---|
| 2005/0015725 A1* | 1/2005 | Matsuda ............... G06F 16/957 715/848 |
| 2005/0030309 A1 | 2/2005 | Gettman et al. |
| 2005/0062740 A1 | 3/2005 | Tobita et al. |
| 2005/0086612 A1* | 4/2005 | Gettman ............... G06F 16/954 715/713 |
| 2005/0125826 A1 | 6/2005 | Hunleth et al. |
| 2005/0137015 A1 | 6/2005 | Rogers |
| 2005/0210396 A1* | 9/2005 | Galli ........................ G06F 8/00 715/758 |
| 2005/0216558 A1* | 9/2005 | Flesch ..................... H04L 67/60 709/225 |
| 2005/0237382 A1 | 10/2005 | White |
| 2006/0046699 A1 | 3/2006 | Guyot |
| 2006/0075055 A1* | 4/2006 | Littlefield ............... H04L 51/04 715/753 |
| 2006/0143569 A1 | 6/2006 | Kinsella |
| 2006/0161867 A1* | 7/2006 | Drucker .................. G06F 16/64 715/810 |
| 2006/0200769 A1* | 9/2006 | Chevallier .......... G06F 3/04815 |
| 2006/0224971 A1 | 10/2006 | Paulin |
| 2006/0233389 A1 | 10/2006 | Mao |
| 2006/0262120 A1 | 11/2006 | Rosenberg |
| 2006/0265652 A1* | 11/2006 | Seitz ....................... G06F 40/58 715/764 |
| 2007/0002057 A1 | 1/2007 | Danzig |
| 2007/0016847 A1* | 1/2007 | Reichardt ............ H04N 21/482 715/202 |
| 2007/0063999 A1 | 3/2007 | Park |
| 2007/0070066 A1* | 3/2007 | Bakhash ............. G06F 3/04845 345/419 |
| 2007/0071204 A1* | 3/2007 | Kanada ................... H04M 3/56 379/158 |
| 2007/0072662 A1 | 3/2007 | Templeman |
| 2007/0106941 A1* | 5/2007 | Chen ................ H04N 21/42203 348/E7.071 |
| 2007/0113181 A1 | 5/2007 | Blattner |
| 2007/0156677 A1 | 7/2007 | Szabo |
| 2007/0168359 A1* | 7/2007 | Jacob ..................... A63F 13/30 |
| 2007/0168863 A1 | 7/2007 | Blattner |
| 2007/0176921 A1 | 8/2007 | Iwasaki |
| 2007/0214106 A1 | 9/2007 | Johnston |
| 2007/0223675 A1* | 9/2007 | Surin ...................... H04L 47/22 379/202.01 |
| 2007/0293313 A1* | 12/2007 | Shimizu ................. A63F 13/57 463/31 |
| 2008/0005237 A1 | 1/2008 | Borys |
| 2008/0012936 A1 | 1/2008 | White |
| 2008/0019531 A1* | 1/2008 | Kimijima ................. H04S 7/30 381/1 |
| 2008/0033661 A1 | 2/2008 | Syroid et al. |
| 2008/0080392 A1 | 4/2008 | Walsh et al. |
| 2008/0082317 A1* | 4/2008 | Rosart ................... G06F 40/263 704/8 |
| 2008/0114599 A1* | 5/2008 | Slotznick ................ G09B 5/06 704/260 |
| 2008/0134055 A1 | 6/2008 | Satchell |
| 2008/0144864 A1* | 6/2008 | Huon ....................... H04R 5/02 381/305 |
| 2008/0172635 A1 | 7/2008 | Ross |
| 2008/0185372 A1 | 8/2008 | Chin et al. |
| 2008/0195372 A1* | 8/2008 | Chin ....................... G06F 40/58 704/2 |
| 2008/0214253 A1 | 9/2008 | Gilio |
| 2008/0215973 A1* | 9/2008 | Zalewski ............... A63F 13/34 715/706 |
| 2008/0234844 A1* | 9/2008 | Boustead ................. H04S 7/30 700/94 |
| 2008/0250315 A1 | 10/2008 | Eronen |
| 2008/0262910 A1 | 10/2008 | Altberg et al. |
| 2008/0262911 A1 | 10/2008 | Altberg et al. |
| 2008/0263446 A1 | 10/2008 | Altberg et al. |
| 2008/0263458 A1 | 10/2008 | Altberg et al. |
| 2008/0263459 A1* | 10/2008 | Altberg ................. H04L 51/046 715/757 |
| 2008/0263460 A1 | 10/2008 | Altberg et al. |
| 2008/0268418 A1 | 10/2008 | Tashner |
| 2009/0019367 A1 | 1/2009 | Cavagnari |
| 2009/0063414 A1* | 3/2009 | White ................. G06F 3/04817 |
| 2009/0144137 A1 | 6/2009 | Moulton et al. |
| 2009/0221367 A1 | 9/2009 | Longley |
| 2009/0319895 A1 | 12/2009 | Kinsella |
| 2009/0327969 A1 | 12/2009 | Estrada |
| 2010/0162119 A1* | 6/2010 | Boustead ............... A63F 13/332 715/757 |
| 2010/0260355 A1* | 10/2010 | Muraoka ................ A63F 13/10 381/107 |

OTHER PUBLICATIONS

Adobe Media Player 1.1 installer, retrieved from <<http://get.adobe.com/amp/>>, 2008.
Akamai Briefing: Highly Distributed Computing is Key to Quality on the HD Web, 2007.
Akamai Homepage, retrieved from <<http://akami.com>>, retrieved on 2008.
Akamai, "A Powerful Delivery Solution, On Demand." 2006.
Akamai Solution, "Stream OS," 2008.
Akamai Stream OS Rss Manager, retrieved on 2008.
"Akamai Helps MSN® Deliver More than 65 Million Video Streams around the World for Record-Breaking Live Earth Event," 2008.
Akamai, "The State of the internet," vol. 1, No. 2, 2008.
Adobe® Media Player, product literature, 2008.
Anystream Agility, Postproduction Workflows, application brief, 2005.
Article on AOL Video Ramps Up Content Offerings, retrieved from <<www.worldscreen.com/print.php?filename=aol82406.htm>>, Aug. 31, 2006.
ASR Editor Screen, 1990.
AQ Design, Inc., product release, Apr. 1992.
"Autodesk Announces Latest 3D and 2D Solutions", retrieved from <<http://usa.autodesk.com/adsk/servlet/item?siteID=12311&id=116156650&format=print>>, retrieved on Sep. 19, 2008.
Autodesk 3ds Max, detailed features, retrieved from <<http://usa.autodesk.com/adsk/servlet/item?siteID=12311&id=8108755&format=print>>, retrieved on Sep. 19, 2008.
Autodesk® Smoke® 2009 brochure.
Autodesk Games webpage, retrieved from <<http://usa.autodesk.com/adsk/servlet/index?id=10225745&siteID=123112>>, retrieved on 2006.
Autodesk Maya Complete—Features, 2008.
Avid Media Composer, Software Features, retrieved on 2008.
"Bebo Joins the Social Networking Ad Race." Nov. 13, 2007.
BDP-S350 Blu-ray Disc™ Player by Sony, product literature, retrieved on Sep. 22, 2008.
Rafat Ali, "Interview: Jeremy Allaire, CEO, Brightcove. We made Multiple Bets and The Platform Side Won," paidContent.org, retrieved on Sep. 2008.
Brightcove™ Homepage, retrieved from <<http://www.brightcove.com>>, 2008.
Ned Berke, "Brightcove Announces Slew of Online Distribution Partnerships," Apr. 2008.
Dan Frommer, "Why Video on Demand is Still Cable's Game to Lose," Sep. 5, 2008.
CBS Launches Broadband Network, retrieved from <http://www.worldscreen.com/print.php?filename=cbs50506.htm>>; retrieved on May 8, 2006.
Cisco TelePresence Webpage, retrieved from <<http://www.cisco.com/en/us/products/ps7060/index.html>> retrieved on 2008.
Comcast Media Center, literature reference, retrieved on 2007.
Comparison of VoIP Software, retrieved from <<http://en.wikipedia.org/wiki/Comparison_of_VolP_ oftware>> retrieved on Jun. 27, 2008.
Crystal Space Homepage, retrieved from <<http://www.crystalspace3d.org/main/Main_Page>>, retrieved on 2008.
DART Motif for In-Stream Publishers Overview, 2007.

(56) References Cited

OTHER PUBLICATIONS

Dayport Syndication Portal, product literature, retrieved on 2007.
Digital Fountain™ CDN for Streaming, product literature, 2007.
Gary Gentile, "Networks Rush to Offer Shows Online," retrieved on Apr. 8, 2006.
Doostang® Homepage. retrieved from <<http://doostang.com>>, retrieved on 2008.
Compusonics DSP-1000 postcard, Jun. 1984.
Compusonics DSP-2002, product brochure, 1985.
Elastic Movies Video demo, 1984.
Emergent Elements, retrieved from <<http:/www.emergent.net>>, retrieved on 2006.
Epic Games, Unreal Technology, retrieved on 2008.
Facebook Homepage, retrieved from <<http://www.facebook.com>> retrieved on 2008.
Face FX, literature, 2006, downloaded on retrieved on 2008.
Adobe® Flash® Media Server 3, product literature, 2008.
Fmod music and sound effects system homepage, retrieved from <<http://www.fmod.org>>, retrieved on 2008.
Vasanth Sridharan, "Why Jeff Bezos Bought into a Tiny Facebook App Company, And Why Should you Care," Sep. 16, 2008.
Global IP Sound. GIPS VoiceEngine PC™, retrieved from <<http://www.globalipsound.com>>, retrieved on 2005.
Global IP Solutions, Medis Engines homepage, retrieved from <<<<http://www.gipscorp.com/default/media-engines.html>>-; 2007, retrieved on Sep. 2008.
GoDaddy homepage, retrieved from <<http://www godaddy com/gdshop/hosting/landing.asp?ci=8971>>. retrieved on Sep. 19, 2008.
Gomez, "No More Guesswork: A Better Way to Measure, Understand and Improve the Online Customer Experience," 2007.
"Google Chrome Makes a Good First Impression," retrieved from <<www.eweek.com>>, retrieved on Sep. 8, 2008.
Vasanth Sridharan, Will Google's Lively Turn Into a Virtual Arcade? (GOOG), Sep. 16, 2008.
Google Earth homepage, retrieved from <<http://www.earth.google.com>> retrieved on 2008.
Google Lively homepage, retrieved from <<http://www.lively.com/html/landing.html>>, retrieved on 2008.
Google SketchUp homepage, retrieved from <<http://www.sketchup.google.com>>, retrieved on 2008.
Hero Engine MMO—Development at Light Speed, retrieved from <<www.heroengine.net>> , retrieved on 2006.
Highwinds homepage, retrieved from <<http://www.highwinds.com>>, retrieved on 2008.
Highwinds, company literature, 2008.
HP Touchsmart PC Webpage retrieved on Sep. 19, 2008.
HP IPTV Solutions 2006.
Jim Rapoza, "IE 8's Private Progress." retrieved from <<www.eweek com>>, retrieved on Sep. 8, 2008.
IMDb.com Adds Movie, TV Streaming. retrieved from <<http://www.worldscreen.com/print.php?filename=IMDB091608.htm>>, retrieved on Sep. 16, 2008.
IMDb homepage, retrieved from <<http://www.imdb.com/features/video>>, retrieved on 2008.
Imeem homepage, retrieved from <<http://www.imeem.com/music>>, retrieved on 2008.
"Inlet Technologies Fathom HD Encoder," retrieved from <<http://www.tvtechnology.com>> Jan. 25, 2006.
Internap, company literature, retrieved on 2008.
Nick Wingfield, "The Internet, The TV," Dec. 11, 2007.
Eric A. Taub, "A Sweet Spot For Every Listener," New York Times article, Aug. 5, 2004.
ITunes interface retrieved on Sep. 2008.
Kontiki 5.0—A New Plateau in Digital Media Delivery, product literature, 2006.
Level 3® Streaming Services retrieved from <<http://www.level3.com>>, retrieved on 2008.
"Level 3 to Support High Capacity Demand for Leading Social Networking Site," Vanguard, Aug. 18, 2006.
"Level 3 Adds Streaming to Global Content Delivery Portfolio," PRNewswire—First Call, Nov. 2007.
Hacking Netflix, "Netflix & LG Partner to Bring Netflix to the TV." user interface, retrieved from <<http://www.hackingnetflix.com/2008/01/netflix-lg-part.html>>, retrieved on Sep. 23, 2008.
Lifestudio: Head 2 7 SDK. product literature, 2006.
Limenight Networks, retrieved on Apr. 2007.
Linkedin Homepage retrieved from <<http://www.linkedin.com>>, retrieved on 2008.
Microsoft Media interface, 2008.
Microsoft Silverlight homepage retrieved from <<http://www.microsoft.com/silverlight>>, retrieved on 2008.
Microsoft VC-1 Media Encoder, retrieved on 2006.
Microsoft in Broadcast and Film retrieved from <<http://www.microsoft.com/mediaandentertainment>>, retrieved on 2006.
Microsoft Expression Studio website retrieved from <<http://www.microsoft.com/expression/features/Default aspx?key=studio>>, retrieved on Sep. 20, 2008.
Peter Burrows, "Microsoft IPTV: At Long Last, Progress," Nov. 6, 2007.
Microsoft® Interactive Media Manager, 2007.
Move Media Player, Move Networks, Inc., retrieved on Sep. 2008.
Move Networks Streaming Media Platform, 2008.
MSoft Media Management retrieved on 2007.
Multiverse: The Total MMOG Platform datasheet retrieved from <<http://www.multiverse.net>>, retrieved on 2006.
MVS-20 Portable Streaming retrieved on Apr. 2006.
"MySpace Implements Technology to Protect Copyrighted Content," retrieved from <<http://www.worldscreen com/print php?filename=myspace021207.html>>, retrieved on Feb. 12, 2007.
MySpace homepage retrieved from <<http://www.myspace.com>>, retrieved on Sep. 2008.
NBC Microsoft Silverlight Summer Olympics, 2008.
Netflix homepage retrieved from <<http://www.netflix.com>>, retrieved on Sep. 2008.
Netgear EVA8000 website retrieved from <<http://www.netgear.com/Products/Entertainment/DigitalMediaPlayers/EVA8000.aspx>>, retrieved on Sep. 2008.
Network Solutions Web Hosting Services webpage retrieved on Sep. 2008.
Ning homepage retrieved from <<http://www.ning.com>>, retrieved on Sep. 2008.
NVidia Quadro product brochure, 2006.
Bambi Francisco, "Your Video vs. Big Media Video," Market Watch, Jun. 15, 2006.
John Boudreau, "Warner Bros. to Distribute Movies on Guba.com," San Jose Mercury News, Jun. 27, 2006.
Online Video websites retrieved from <<http://eyespot.com>>; <<http://www.hulu.com>>; <<http://www.stickam.com>>; <<http://www.ustream.com>>; <<<veoh.com>>; <<http://www.youtube.com>>; <<http://www.mogulus.com>>; <<http://www.justin.tv>>; retrieved on 2008.
OpenAL homepage retrieved from <<http://connect.creativelabs.com/openal/default.aspx>>, retrieved on Sep. 2008.
Industry Leaders to Announce Open Platform for Mobile Devices, Nov. 5, 2007.
Operation MySpace, Event Streaming, 2008.
Panache Dynamic Ad Delivery retrieved on Sep. 2008.
Panther CDN, Leader in Video Delivery retrieved from <<http://www.pantherexpress.com>>, retrieved on Sep. 2008.
PJSIP.org homepage retrieved from <<http://www.pisip.org>>; retrieved on Sep. 2008.
Plaxo homepage retrieved from <<http://www.plaxo.com>>, retrieved on Sep. 2008.
Prasolova-Forland et al., "Place Metaphors in Educational Cybervvorlds: a Virtual Campus Case Study," Proceedings of the 2005 International Conference on Cyberworlds IEEE Computer Society, CA, Nov. 23, 2005, pp. 221-228.
RailsSpace™ Homepage retrieved from <<http://www.railsspace.com>> retrieved on Sep. 2008.
Realviz VTour, 3D Tours, retrieved from <<http://www.realviz.com>>, retrieved on Aug. 2008.

(56) References Cited

OTHER PUBLICATIONS

Robertson et al., "Information Visualization Using 3D Interactive Animation," Communications of the ACM, vol. 36, No. 4, Apr. 1, 1883, pp. 57-71.
Second Life homepage retrieved from <<http://www.secondlife.com>>, retrieved on 2008.
Skype website retrieved on 2008.
Slingmedia homepage retrieved from <<http:/www.slingmedia.com>>, retrieved on Sep. 2008.
Sony Vaio LT series webpage retrieved on Sep. 19, 2008.
Sony LT PC series webpage retrieved webpage retrieved on Sep. 19, 2008.
Stim TV Media Player retrieved on Apr. 2007.
Streambox, product literature, 2008.
Syflex, The Cloth Simulator retrieved on Aug. 2006.
StreamtheWorld, product literature, retrieved on May 2008.
SyncCast, product literature, retrieved on Apr. 2008.
TAT homepage retrieved from <<http://www.tat.se>>, retrieved on Sep. 2008.
Erica Naone, "Who Owns Your Friends?" Technology Review, Jul./Aug. 2008, pp. 44-62.
Telestream, product literature, retrieved on Apr. 2007.
The Platform, "Smarter Media Management and Publishing," overview, Apr. 2007.
The Platform, "Better Player Design with a Lot Less Work," overview, Apr. 2007.
"Tivo Launches Service to Bring Broadband Content to TV," retrieved from <<http://www.worldscreen.com/print.php?filename=tivo60706.htm>>, retrieved on Jun. 8, 2006.
"Cartoon Network, VIZ Report Success of Broadband Service," retrieved from <<http://www.worldscreen.com/print.php?filename=toon81606.htm>>, retrieved on Aug. 22, 2006.
Torque Game Platform Pricing retrieved on 2006.
Tremor Media Acudeo advertising platform, 2007.
The Platform, UIEvolution Mobile Video retrieved on Apr. 2007.
Valve Software homepage retrieved from <<http://www.valvesoftware.com/business>>, retrieved on Sep. 2008.
VBrick® Etheme TV, product literature, 2006.
VBrick VBCorpCast, product specifications, retrieved on Apr. 2006.
VDONET Corporation, Bringing the Power of Video to the Net, technical specifications, 1997.
Versign® Intelligent CDN, Data Sheet, 2007.
Vicious Engine, advertisement, retrieved on 2006.
Vital Stream, online advertising services, retrieved on Apr. 2007.
Vital Stream, CDN, product literature, retrieved on Apr. 2007.
Voip-info org, SIP Express Router, retrieved from <<http://www.voip-info.org/wiki-SIP+Express+Router>>, retrieved on Sep. 2008.
Definition of Web Crawler from Wikipedia retrieved from <<http://www.en.wikipedia.org/wiki/webcrawler>>. retrieved on Aug. 22, 2006.
Windows Live homepage retrieved from <<http://www.home.live.com>>, retrieved on Sep. 2008.
Windows Movie Maker interface retrieved on 2008.
World of Warcraft homepage retrieved from <<http://www.worldofwarcraft.com/index.xml>>, retrieved on 2008.
Xbox Live Introduction retrieved from <<http://www.xbox.com.en-US/live/introduction101.htm>>, retrieved on Sep. 19, 2008.
Yahoo 380 homepage retrieved from <<http://www.360.yahoo.com/login.html?.done=http%3A%2F%2F360.yahoo.com%2F&.src=360>>, retrieved on Sep. 2008.
YouTube Unveils New Advertising Model, retrieved from <<http://www.worldscreen.com/print.php?filename=you82006.htm>>; retrieved on Aug. 22, 2006.
Bobby White, "Watching You Tube on the Boob Tube," The Wall Street Journal, retrieved from <<http://online.wsj.com/article print/SB115084922665485799.html>>. retrieved on Jun. 26, 2008.
Charlie Demerjian, "Zione Secures VoIP," retrieved from <<http://www.theinquirer.net/?article=25012>>, retrieved on Jun. 27, 2006.
Various articles relating to CompuSonics dated 1984-1985.
AQ Media, Supplementary European Search Report for EP 08 83 3271, Sep. 9, 2013, 8 pages.
AQ Media, International Search Report in corresponding PCT/US2008/077817 dated Dec. 8, 2008.
Stephanie Armour, "Special Report: Bringing a dot-com to Life," retrieved from <<www.usatoday.com/money/dotcoms/dot003.htm>>, Jun. 19, 2000.
Tim Bajarin, "Silicon Insights: Letting You Be You," retrieved from <<http:/abcnews.go.com>>, retrieved on Mar. 20, 2008.
Ken Cimino, "Just Say No to Dull Desktop Interfaces," retrieved from <<http://siliconvalley.internet.com/news/print.php/413771>>, Jul. 13, 2000.
Steve Silverman, "Startups Hope GUIs are Sticky Sweet," retrieved from <<www.redherring.com>>, dated May 18, 2000, retrieved on Mar. 20, 2009.
ZDNN staff. "San Francisco—A Software Stat-up Here has Developed a Replacement for Web-Browser Bookmarks that Could Evolve into a New Form of Web-Based Environment and Community," retrieved from <<http://news.zdnet.com/2100-9595_22-106047.html>>, Mar. 6, 2000.

* cited by examiner

AUDIO-VISUAL NAVIGATION AND COMMUNICATION DYNAMIC MEMORY ARCHITECTURES

CROSS REFERENCE TO RELATED APPLICATIONS

The present application is a continuation application of and claims priority to pending U.S. patent application Ser. No. 17/812,080, filed Jul. 12, 2022, which is a continuation application of and claims priority to U.S. patent application Ser. No. 17/342,854, filed Jun. 9, 2021, which is a continuation application of and claims priority to U.S. patent application Ser. No. 16/823,761, titled "Audio-Visual Navigation and Communication Dynamic Memory Architectures," filed Mar. 19, 2020, which is a continuation application of and claims priority to U.S. patent application Ser. No. 16/208,287, titled "Audio-Visual Navigation and Communication Dynamic Memory Architectures," filed Dec. 3, 2018, which is a continuation of and claims priority to U.S. patent application Ser. No. 15/200,877, titled "Audio-Visual Navigation and Communication Dynamic Memory Architectures," filed Jul. 1, 2016, which is a continuation of and claims priority to U.S. patent application Ser. No. 13/607,410, titled "Audio-Visual Navigation and Communication Dynamic Memory Architectures," filed Sep. 7, 2012, which is a continuation of and claims priority to U.S. patent application Ser. No. 12/861,698, titled "Audio-Visual Navigation and Communication Dynamic Memory Architectures," filed Aug. 23, 2010, which is a continuation of and claims priority to U.S. patent application Ser. No. 12/239,333, titled "Audio-Visual Navigation and Communication Dynamic Memory Architectures," filed Sep. 26, 2008, which claims the priority benefit of U.S. Provisional Patent Application No. 60/995,353, titled "System and Method for Graphical Interface and Computer Program Product for Audio-Visually Representing and Tuning Communication/Publishing Nodes Multi-Dimensionally," filed Sep. 26, 2007, all of which are hereby incorporated by reference in their entirety.

BACKGROUND

1. Field of the Invention

Embodiments of the invention relate to technology for communicating information via a user platform.

2. Description of Related Art

Various systems and methods exist to communicate audio and visual information, including broadcast radio and television, satellite radio and television, cable television, telephone, cellular telephone, facsimile, voice over internet protocol (VoIP), personal video recorders (PVR), personal computers (PC), game consoles, personal digital assistants (PDA), and software applications operable over networks such as the Internet. The various systems differ both in the transmission types and methodologies employed to communicate information, and in the devices and interfaces designed to receive and interact with the information. Based on the technology behind the distribution systems, these various means of communicating information also differ in scope, or size of audience.

The entire production process of media creation and content development has moved into the digital domain over the last twenty years, from recording to editing to finishing. The price of this technology continues to drop, lowering the barriers to entry and allowing the tools for the creation of content to fall into more and more hands. This digitization of the production process is more or less complete, constituting a replacement of analog tools with digital ones, and creating a vast new group of publishers.

The digitization of publishing, distribution and delivery, is still in a state of flux, with the final outcome more likely to be a new context for communicating information. Reasons for this are at least threefold: the ease of creation of digital content and its corresponding pervasiveness; the simplicity of distributing that content to a worldwide audience; and the ability to inexpensively communicate with others around the globe. Termed user-generated content, this enormous new stream of multimedia is coming online to compete and coexist with the output from terrestrial broadcasters, satellite and cable providers, radio stations, and other traditional publishers, the current controllers of distribution. Most of this new traffic is centered on the Internet, using standard web browser software, enhanced with plug-ins for 2-D animation/video.

Many of the world's media publishing and communications networks now terminate at the end user with an inexpensive computer. Inexpensive tools exist to create content. Users can subscribe and connect to a worldwide web through these existing networks, publishing and viewing published media, and communicating with each other, but not in an integrated fashion.

Current methods for displaying information on a computer display involve icon- or hyperlink-based point-and-click operations enacted upon windowed or paged 2D screens. Selecting an object involves hovering over the item to be selected, which can sometimes bring up a small textual informational overlay, or more recently 2D animation effects such as size scaling of the item to be selected, and then explicitly clicking to select. Drop-down menus invoke lists for further decision-making.

Media playback can occur through the use of a variety of media players from many industry participants, usually functioning via a play list-type interface. Most can play audio and video files, one at a time, with the need to go back to the desktop or browser environment to pick new material, unless a play list has been loaded. Playback of simultaneous files is not generally supported in consumer media applications, nor are overlapping audio fields, though sometimes multiple instances of the same application can be opened to run simultaneously. Many Voice-Over-IP (VOIP) applications exist but target communication only, with chat, and sometimes accompanied with file sharing. Webcam video input is possible from some providers. Screen display layout is designed for close-up viewing, especially on small handheld devices such as smart phones and PDAs. The majority of applications employ text which can not be read from 10 feet away. The majority of applications do not employ handheld remote controls. Videogames represent the most advanced use of 3D computer display, processor power, and input devices. Virtual environments exist both as games and as more social destinations. User interaction is usually complex, although recently casual gaming has become popular. Gaming still remains the primary activity of these types of programs, versus the more routine activities of everyday life, but advanced gaming consoles are starting to offer movie and music downloads.

SUMMARY OF THE INVENTION

The technology includes buffering, on a user platform, data associated with a spatial publishing object data store at a buffer distance proximate a user presence in a spatial publishing object space. The buffer distance comprises a measure based at least in part on at least one of: capacity of a communications path between the spatial publishing object data store and the user platform; availability of memory at the user platform; movement of the user presence through the spatial publishing object space; traffic in the communications path; processing resources available; amount of spatial publishing objects within a distance of the user presence; amount of spatial publishing objects in the spatial publishing object space; type of spatial publishing objects; proximity of a spatial publishing object to the user presence; and rate of the user presence movement in the spatial publishing object space. The movement of the user presence in the spatial publishing object space buffers data such that data for a proximate spatial publishing object in the space is available in the buffer for presenting to the user when the user's presence is a predetermined distance from the proximate spatial publishing object.

The technology further includes buffering, on a user platform, data associated with a spatial publishing object data store at a buffer distance proximate a user presence in a communication space. The buffer distance is based at least in part on: a capacity of a communications path between the spatial publishing object data store and the user platform; availability of memory; traffic in the communications path; processing resources available; amount of spatial publishing objects within a distance of the user presence; amount of spatial publishing objects in the space; type of spatial publishing objects; and proximity of a spatial publishing object to the user presence. Such buffering further includes establishing an order for a plurality of spatial publishing objects, arranging the spatial publishing objects about a location based on the order; and buffering spatial publishing object data associated with the arranged plurality of spatial publishing objects within a predetermined distance from the user presence.

The technology further includes a method for buffering data in a system for allowing movement of a user presence through a computer-implemented spatial publishing object space. Spatial publishing objects retrieved from a data store are buffered in a user platform for display by buffering data associated with each spatial publishing object in a spatial publishing object space that is within a buffer distance of a user presence in the space. The buffer distance comprises a measure selected from the group consisting of: capacity of a communications path between the data store and the user platform; availability of memory at the user platform; movement of the user presence through the spatial publishing object space; traffic in the communications path; processing resources available; amount of spatial publishing objects within a distance of the user presence; amount of spatial publishing objects in the space; type of spatial publishing objects; proximity of the spatial publishing objects to the user presence; internet bandwidth; and rate of movement of the user presence in the spatial publishing object space.

BRIEF DESCRIPTION OF THE DRAWINGS

Embodiments of the technology are illustrated by way of example and not limited in the following figures.

DETAILED DESCRIPTION OF THE INVENTION

Figure 1:
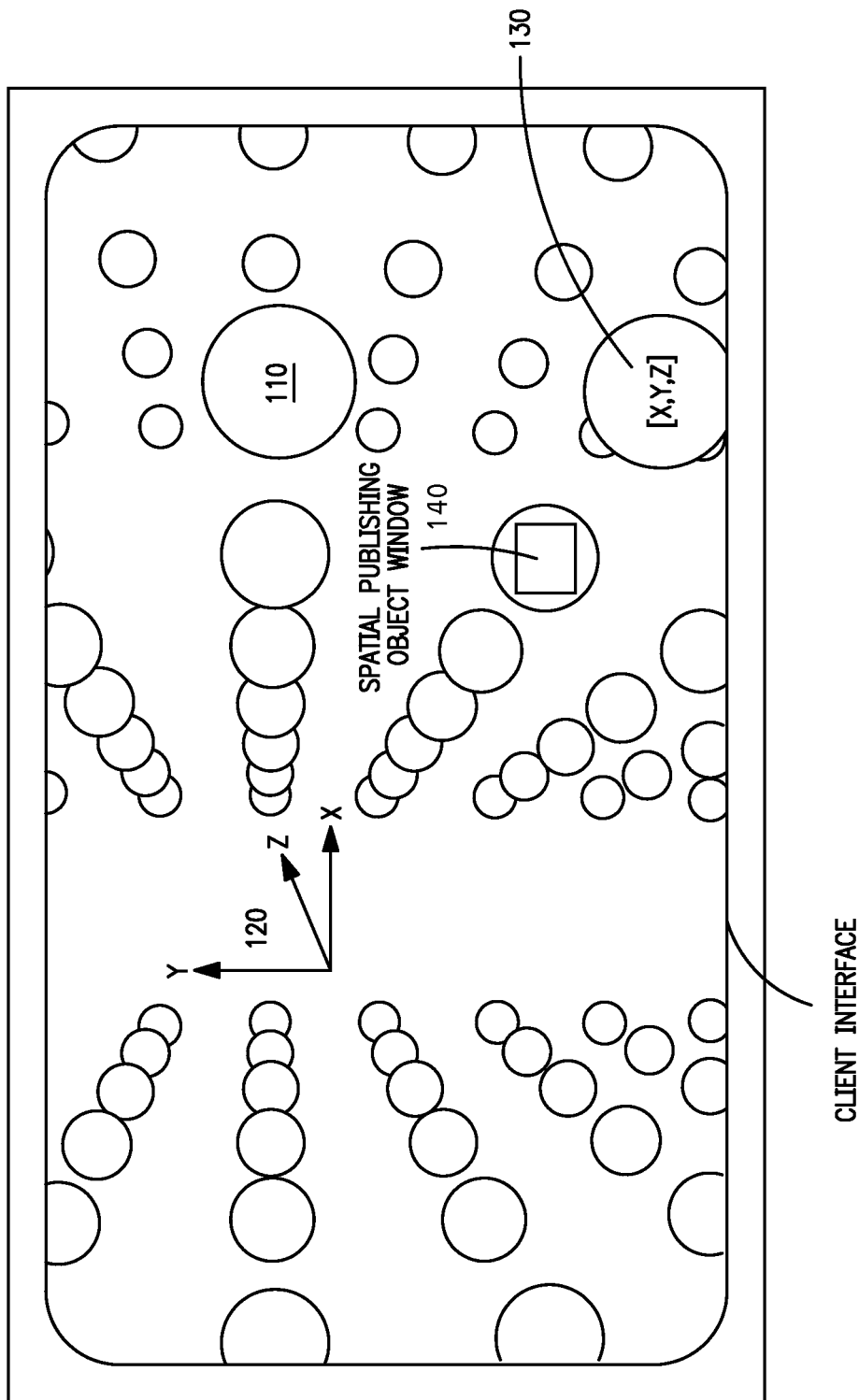
FIG. 1 illustrates a 3D spatial publishing object space of the present technology.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. Further, individual characteristics of the technology can be omitted from any given embodiment or combined in various ways to produce patentable embodiments of the technology.

The technology supports communication of information through a user platform. "Communication" as used to describe the technology includes both one-way (e.g., display, presentation, performance) and two-way (e.g., dialog, chat, interactive participation) interface. Information includes both content (e.g., human viewable/hearable content and computer readable data) and metadata (e.g., spatial publishing object control/status data), and can take the form of e.g., text, graphics, photo, audio, binary files, and video. User platforms include those devices capable of outputting at least one of the forms of information. Such platforms include personal computers, cellular telephones, and personal digital assistants.

A spatial publishing object is a basic unit of the technology. It is, for example, representative of any content such as the voice of a single user, a conversation stream between users, the programmed output of a multimedia broadcast network, a user's presence on the World Wide Web, or the collection of books of a corporate publisher, along with the metadata associated with the content. In addition to information, spatial publishing objects are associated with functionality such as that of a telephone, a television, streaming audio player, blog, website, chat room, and sound studio. In the Provisional Application, spatial publishing objects were variously referred to as Spatial Publishing ObjecTs, SPOTs, and spots. A spatial publishing object can include one or more other spatial publishing objects. Spatial publishing objects are instances of a broader class of information objects.

Spatial publishing object information and functionality can be made available external to the spatial publishing object, in a fashion similar to how data and methods are made "public" in object oriented programming. Information and functionality can be made available internal to the spatial publishing object, in a fashion similar to how data and methods are made "private" in object oriented programming—though in preferred embodiments of the technology, much functionality is implemented in a browser-like application and not within the spatial publishing object itself. Additionally in some embodiments of the technology, spatial publishing objects, information, and functionality are be subject to access control as known to those skilled in the art, e.g., password protection, authentication, verification, encryption.

Figure 2:
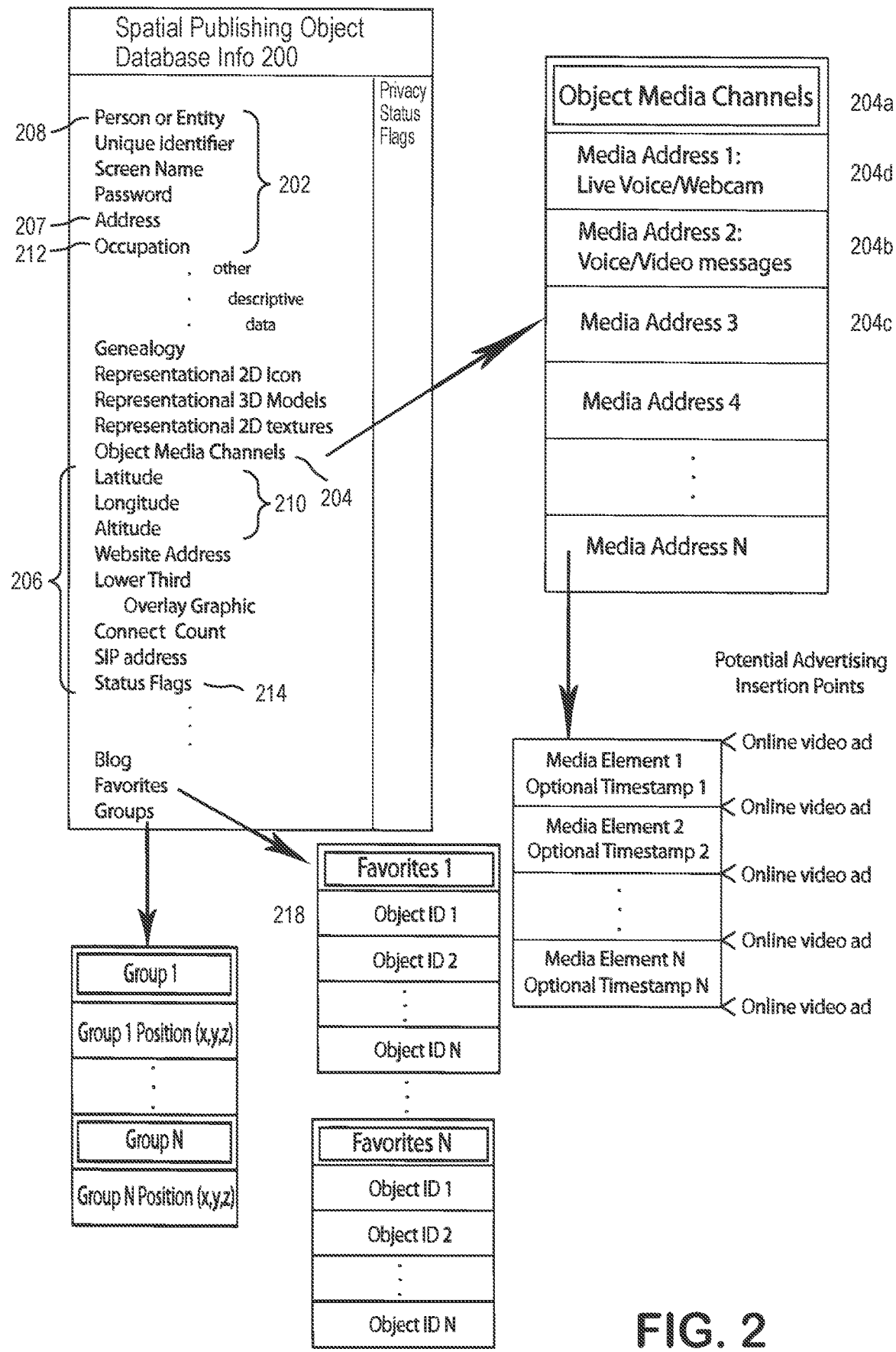
FIG. 2 illustrates a spatial publishing object database record of the present technology.

Referring to FIG. 2, spatial publishing objects can be represented as records 200 in a spatial publishing object database containing both metadata, e.g., 202 and content or links/pointers thereto, e.g., 204a, 204b, 204c. A spatial publishing object can be represented in the structured framework of a record 200 within a database with the appropriate fields, e.g., 206, designed to allow queries to be performed across the entire range of spatial publishing objects to return results of targeted relevance to a user. Spatial publishing object metadata can include information about the publisher of the spatial publishing object, including but not limited to, name and address 207, person or entity 208, title, geo-spatial location 210, gender, educational level, employment history 212, hobbies and interests, theme, and spatial publishing object status or state information 214. Spatial publishing objects records can include other spatial publishing objects or links thereto, e.g., 218.

Figure 4:
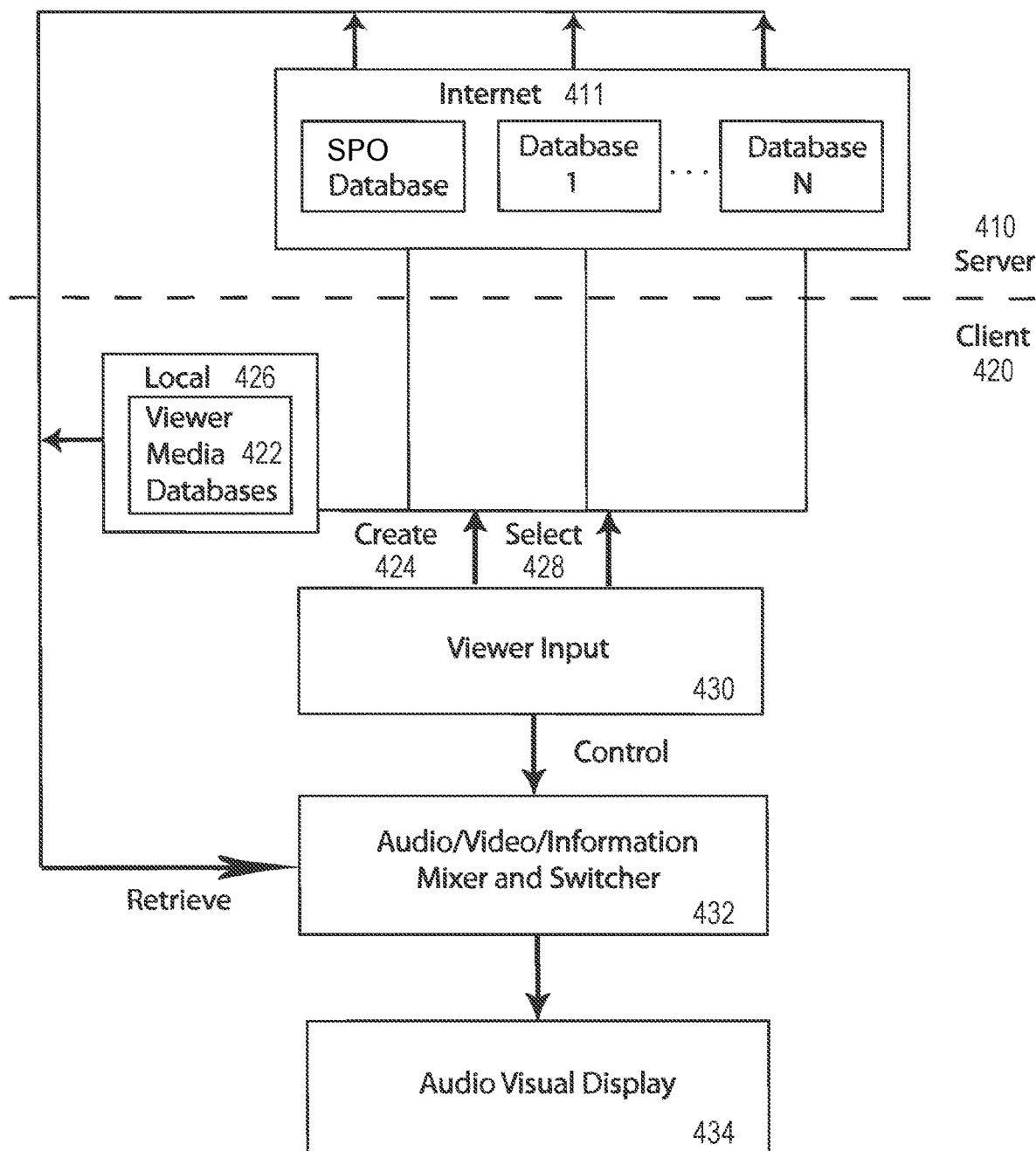
FIG. 4 illustrates a network context of embodiments of the present technology.

Referring to FIG. 4, spatial publishing object databases can be both local 420 and remote, native or from a server 410, or collected through permission-enabled and tagged access from and through a distributed network such as the Internet 411, and including other types of media forms and locations. For example, in some embodiments, content local to a user platform 422, such as purchased music or videos, can also be included as part of the user's SPO space for easy access within the context of public spatial publishing objects, but will not be necessarily available to other users. In some embodiments, this serves as a means of caching, e.g., where a remote spatial publishing object database points to a remote copy of a song, a local copy of that song can be used instead of the remote copy to avoid the latency of buffering or streaming the song from the remote location. Information is created 424 and/or selected 428 in either local or remote database sources by a user 430, including live video and audio information. The information is then retrieved and filtered by an audio/image/information mixer and switcher 432 under user control to create the final output for the audiovisual display software 434 made up of an audio library and 3D graphics engine for representation on a display 434 of a user platform.

Referring to FIG. 1, Spatial Publishing Objects (SPOs), e.g., 110 are represented on a user platform display as entities in a three-dimensional SPO space 120. Entities can be displayed as 2D (e.g., "billboards" that always appear to face the user's POV), preferably as 3D, entities in the SPO space. The SPO space can have an arbitrary origin, with SPO positions in the SPO space indicated by coordinates [X, Y, Z] 130; though other coordinate systems, e.g., spherical, can be used. The SPO space is populated, at least in part, by SPOs that come from a SPO database as responsive to a query. The query that determines which spatial publishing objects are returned can be as simple as "SPOs in <SPO space name>," or as complicated as a long Boolean construct or Structured Query Language (SQL) statement(s). Queries can either explicitly be entered by the user or determined based on data inherent in the current state of the user presence or the spatial publishing object selected. The SPO space is further populated by the user presence, and can be populated by spatial publishing object(s) of other user(s) even though those spatial publishing objects are not necessarily responsive to the query that populated the SPO space, e.g., another user having presence in the SPO space, an advertising object in the SPO space. User presences and user SPOs, like SPOs responsive to the query that populates the SPO space, can be displayed as 2D, preferably 3D, entities in the SPO space.

Figure 7:
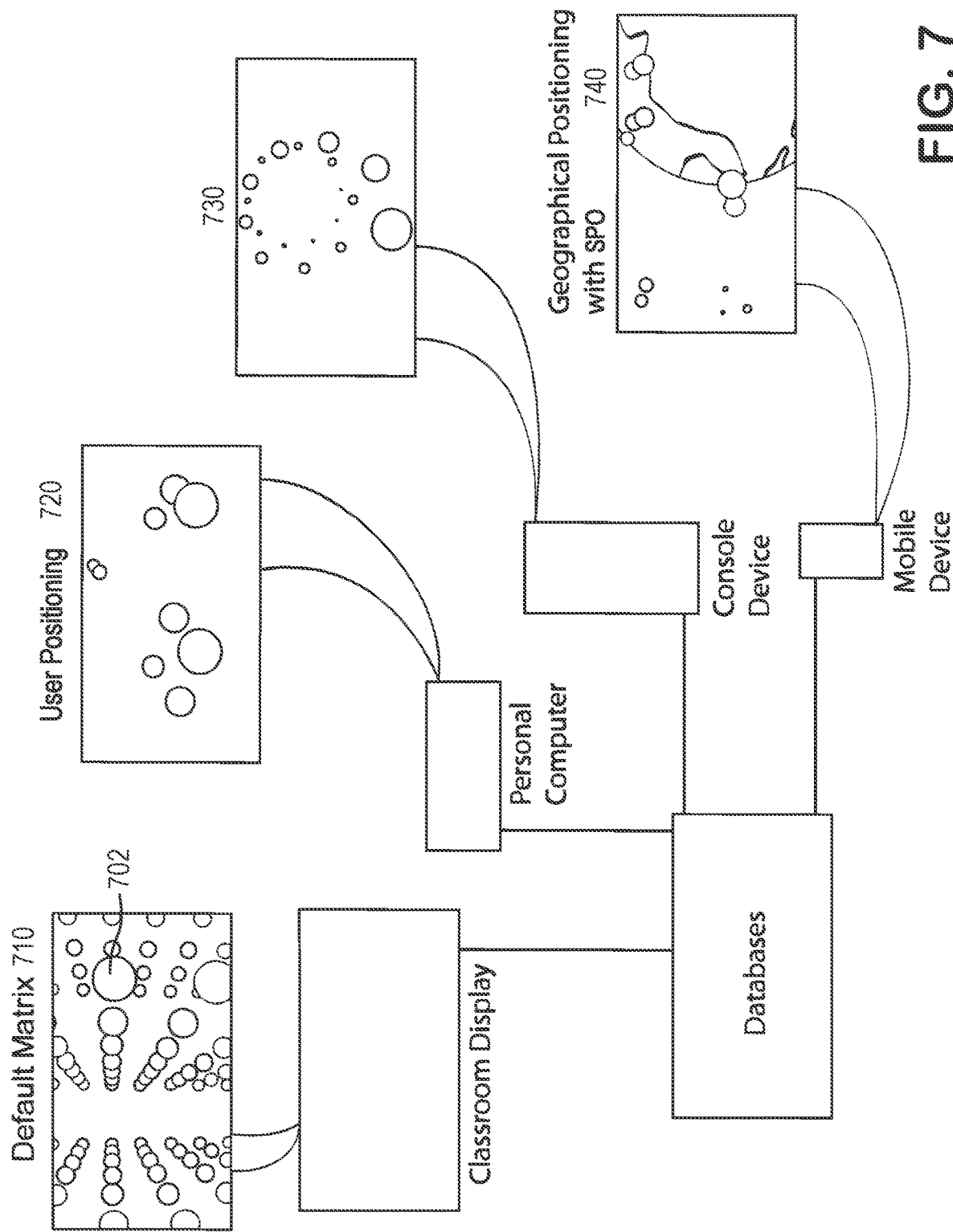
FIG. 7 illustrates spatial publishing object arrangements within a spatial publishing object space of embodiments of the present technology.

Referring to FIG. 7, SPOs, e.g., 702 can be positioned in the SPO space, e.g.: at discrete positions (e.g., X, Y, and Z are integers), e.g., the intersections of a regular three-dimensional matrix 710, regular points on a spiral 730, or other geometric pattern; continuously, as shown in the example user positioning 720, and the example geographic location positioning 740; or a combination of discrete and continuous. Given that SPOs are preferably 3D entities having volume, positioning is influenced by the size of SPOs and is subject to thresholds set in software or by a user (including by a publisher of the entire SPO space).

In some embodiments, the SPO space comprises simple 3D SPO spheres positioned on the integer value coordinate points [X, Y, Z]. New SPOs can be added to abut the existing SPOs, so that the origin is wrapped by new spatial publishing objects a single layer wide, starting from the bottom on up one L-shaped row at a time, until a new plane is added on top, roughly preserving a cubic origin spatial publishing object matrix. This spatial grouping serves as the origin SPO space or starting point. Spatial publishing objects in a 3-dimensional matrix can be positioned in such a fashion, in combination with other spatial publishing objects, as to create larger 3-dimensional shapes in SPO spaces other than the origin SPO space. Outside of the initial user experience within the SPO space, display modes can consist of spatial publishing object arrangements conforming to user manipulation, configuration, and preference, or SPO spaces created as saved arrangements in the software to allow specific SPO space configurations such as the depiction of spatial publishing objects based on their global positioning data to create a 3-dimensional global shape within the SPO space. Configuration information in the form of user preferences can be saved by the software so that the program can either start with the origin SPO space or with a SPO space selected by the user, such as the last SPO space accessed. Customized user SPO spaces can be saved under a name for instant recall. Users can select from these saved arrangements within the browser/file management-like program.

SPOs can be ordered in the SPO Space in a variety of ways including: distance from a reference (e.g., an origin) indicating relevance to the query that returned spatial publishing objects for the SPO space; with reference to a background, as shown in the example three-dimensional background of the earth using a geographic location 740 associated with the SPO; as characteristics mapped to axes, e.g., time/order to the X axis, category (e.g., sports, finance, arts, music genre) to the Y axis, alphabet to the Z axis; as arbitrary positioning, e.g., as by a user 720; and in appropriate combinations of fashions. As with SPO positioning, SPO ordering can be subject to parameter bounds set in the software or by users, e.g., songs ordered by frequency of play, most recently accessed spatial publishing objects, friends' SPOs ordered by frequency of connect operations (described herein).

Certain characteristics of the SPO space (e.g., how spatial publishing objects are ordered in the SPO space) can be governed by implicit user choices (e.g., query terms such as "music" that called forth the spatial publishing objects for the SPO space can govern how the spatial publishing objects are arranged in the SPO space; for example "music" can cause spatial publishing objects to be arranged by music category such as "rock," "rap," etc.), and explicit user choices (e.g., where information of certain types is displayed on the display; example, current spatial publishing object metadata may appear in a bubble over the spatial publishing object or appear in a panel on the side of the display that is outside the image of the SPO space).

In some embodiments, the initial display mode is user-selectable in that the spatial publishing objects appear according to user preference. For example, upon starting software of the technology, a user can have on his display screen several commonly accessed spatial publishing objects, favorites, such as his family members and friends, and then, after executing a query for "deep sea fishing," a new crop of spatial publishing objects next to that with people and publishers related to that topic to traverse.

Operations in the SPO space are normally focused around the user presence. One of the most basic operations in the technology is navigation of the user presence through the SPO space. When the user presence is coincident with the user point of view (POV), which is the default condition, navigation and point of view are from the user presence. In other operations, described herein, the user POV can be separated from the user presence. Preferred embodiments enable navigation in at least a 2D subspace of the SPO space, and preferably in all three dimensions of the SPO space. Further, the user presence and user POV can be coincident with a user's spatial publishing object. While a user has access to some functionality without a user spatial publishing object, e.g., navigate user presence and select spatial publishing objects, the user will not access the more interactive functions.

Figure 10:
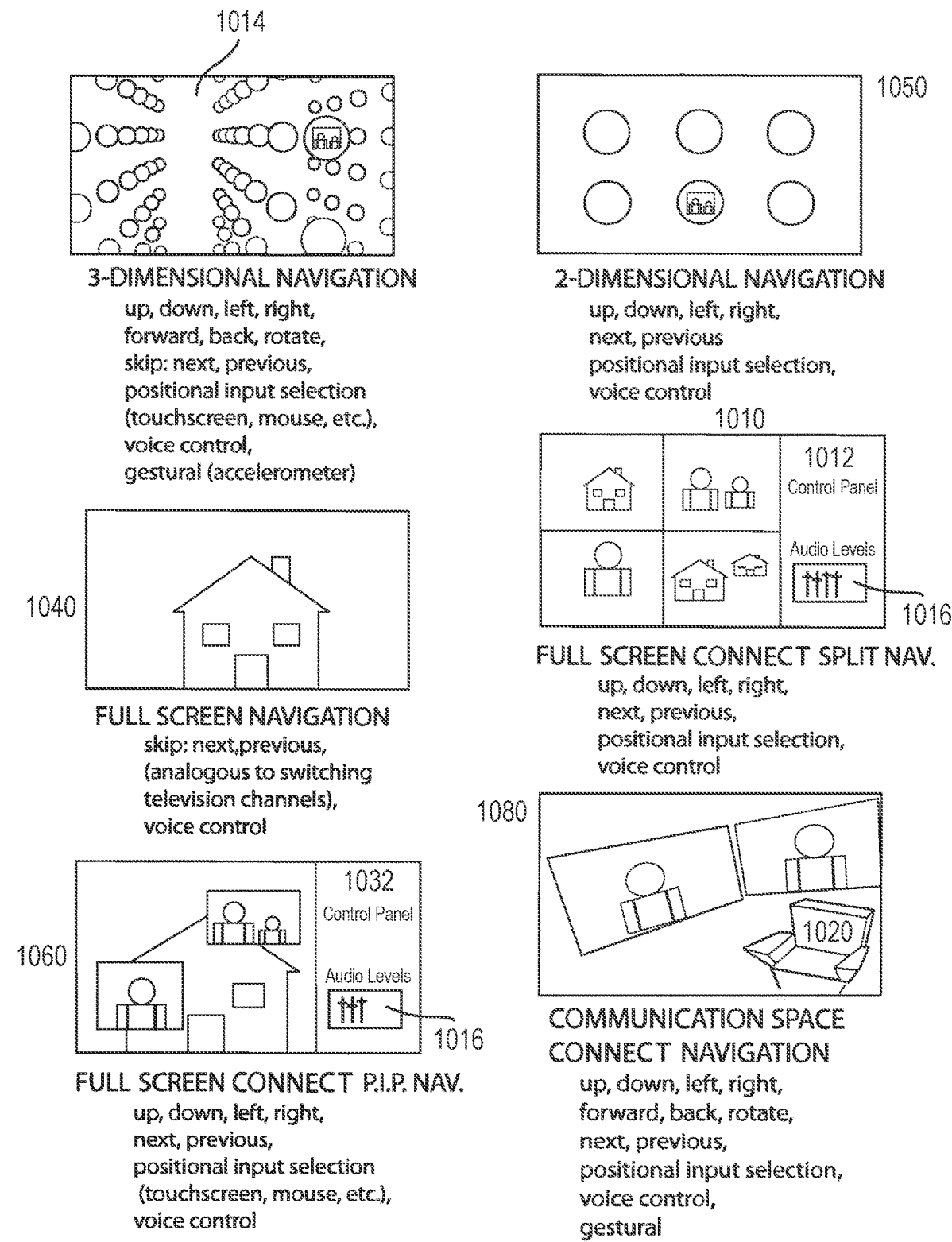
FIG. 10 illustrates control and display modes of embodiments of the present technology.

A user can navigate through a SPO space in any direction, e.g., referring to FIG. 10, 1014. Options for navigating a user presence through a SPO space include autopilot, e.g., automatic routing based on parameters (optionally user supplied) and random routing (similar to "shuffle" used in conventional technology). For example, autopilot navigation can use the input of a standard Global Positioning System tracking data file, and can be used in conjunction with a geographic background SPO space.

As another example, a passive viewing or listening experience can be provided. A user can enter random passage mode during which traversal of the SPO space, or across SPO spaces, is automated. The user presence moves from object to object with random changes of direction to provide an experience like the seek function on a radio or the shuffle function on a digital audio device. Time spent on specific spatial publishing objects can be segment- or play list item-based, in other words, when a new spatial publishing object is reached, segment skip is executed to skip ahead on the spatial publishing object to the next full play list item to guarantee a complete song or video playback before moving on to the next spatial publishing object. Spatial publishing objects publishing non-segmented material such as a voice conversation can play for a user configurable time duration before the user presence moves to the next spatial publishing object. Note that movement of the user presence can be continuous or discontinuous (e.g., jump). The user can stop the random passage, or skip ahead to the next random spatial publishing object, at any time.

A user's POV can be separated from the user's SPO, enabling the user to move beyond a first person vantage point, e.g., to a third person visualization of the user's own spatial publishing object in context with other spatial publishing objects on the display in static or dynamic views. A global visualization allows viewing of dynamic user spatial publishing object movement based upon real-time changes in a user's SPO location data, which changes can mirror actual movement around the real world or be input via other controlling mechanisms.

A user's POV can be separated from the user presence, allowing the user to visualize spatial publishing object spaces from a POV outside of their own, such as in the case which occurs when another spatial publishing object within the user's connection group is elected to lead motion through the SPO space (described herein).

Spatial publishing objects can be selected explicitly through naming, or can be selected implicitly through proximity. Selection reveals a subset of the information that is external to a spatial publishing object. For example, selection of broadcast news SPO reveals a stock ticker (text), with video and audio of a news anchor reading the current top stories.

Figure 8:
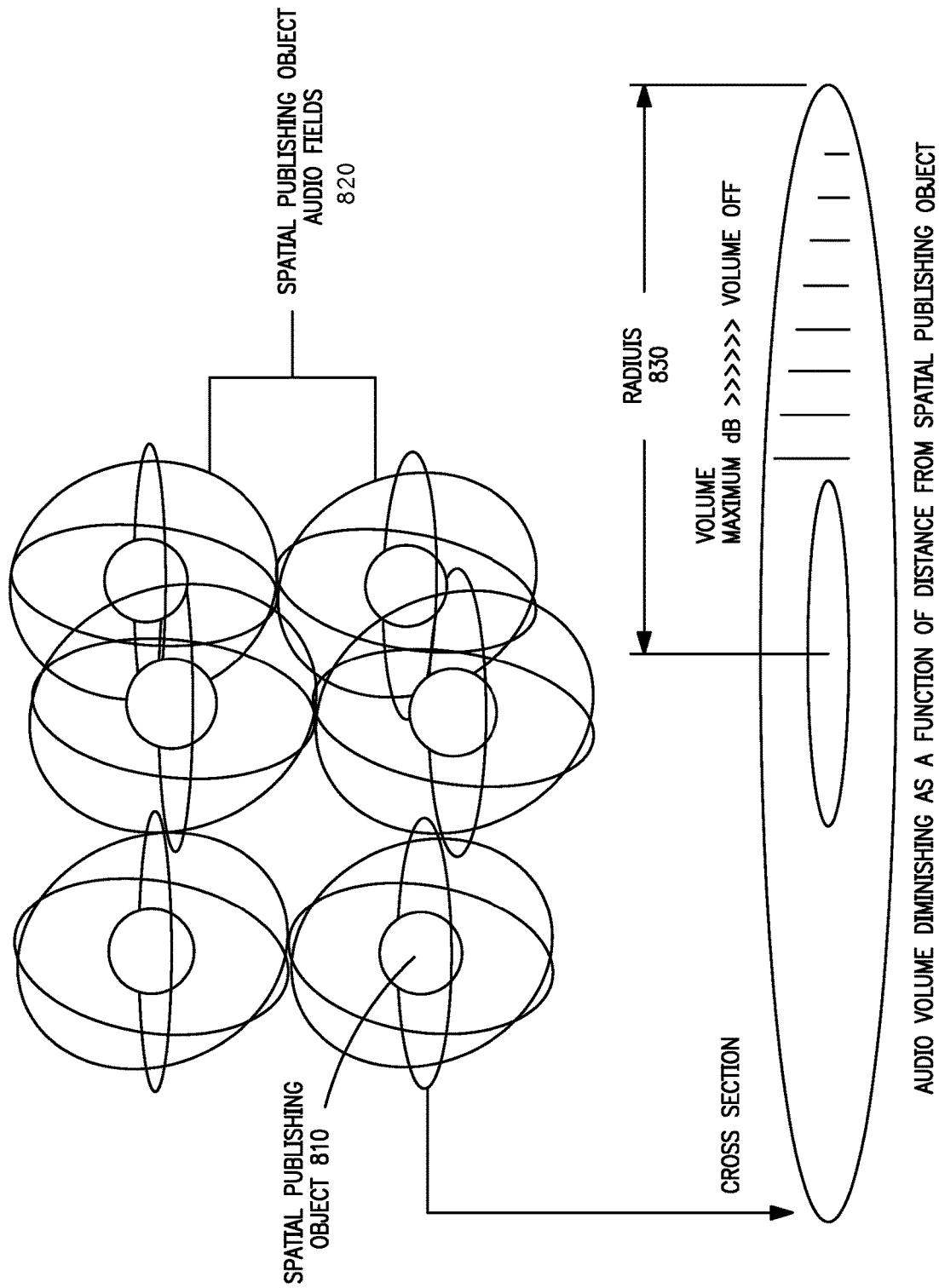
FIG. 8 illustrates audio characteristics of embodiments of spatial publishing objects within the technology of the present invention.

Operations initiated by proximity include others beyond select such as play audio (both exterior and interior); and connect, which can occur implicitly if a user presence stays in the proximity of a spatial publishing object for longer than a selectable time threshold. Referring to FIG. 8 as an example of proximity operations, in some embodiments, a SPO 810 is surrounded by a spherical audio field 820. The volume of a SPO's audio as heard by a user having a user presence in proximity with the SPO diminishes as a function of distance of the user presence from the spatial publishing object. In an illustrative case, a spatial publishing object's volume is inaudible beyond a radius 830 of the spherical audio field whose diameter equals the distance across the SPO's compartment in a spatial publishing object boundary lattice (described herein with respect to FIGS. 11-14). In this case, each spatial publishing object broadcasts audio that is hearable when the user presence is in proximity to that spatial publishing object, fading out and then potentially switching to a new spatial publishing object's audio that fades in as the user presence approaches the new spatial publishing object. Audio fades can follow a variety of profiles, e.g., logarithmic, linear, abrupt, discontinuous, and stepwise, and are user-configurable.

Figure 9:
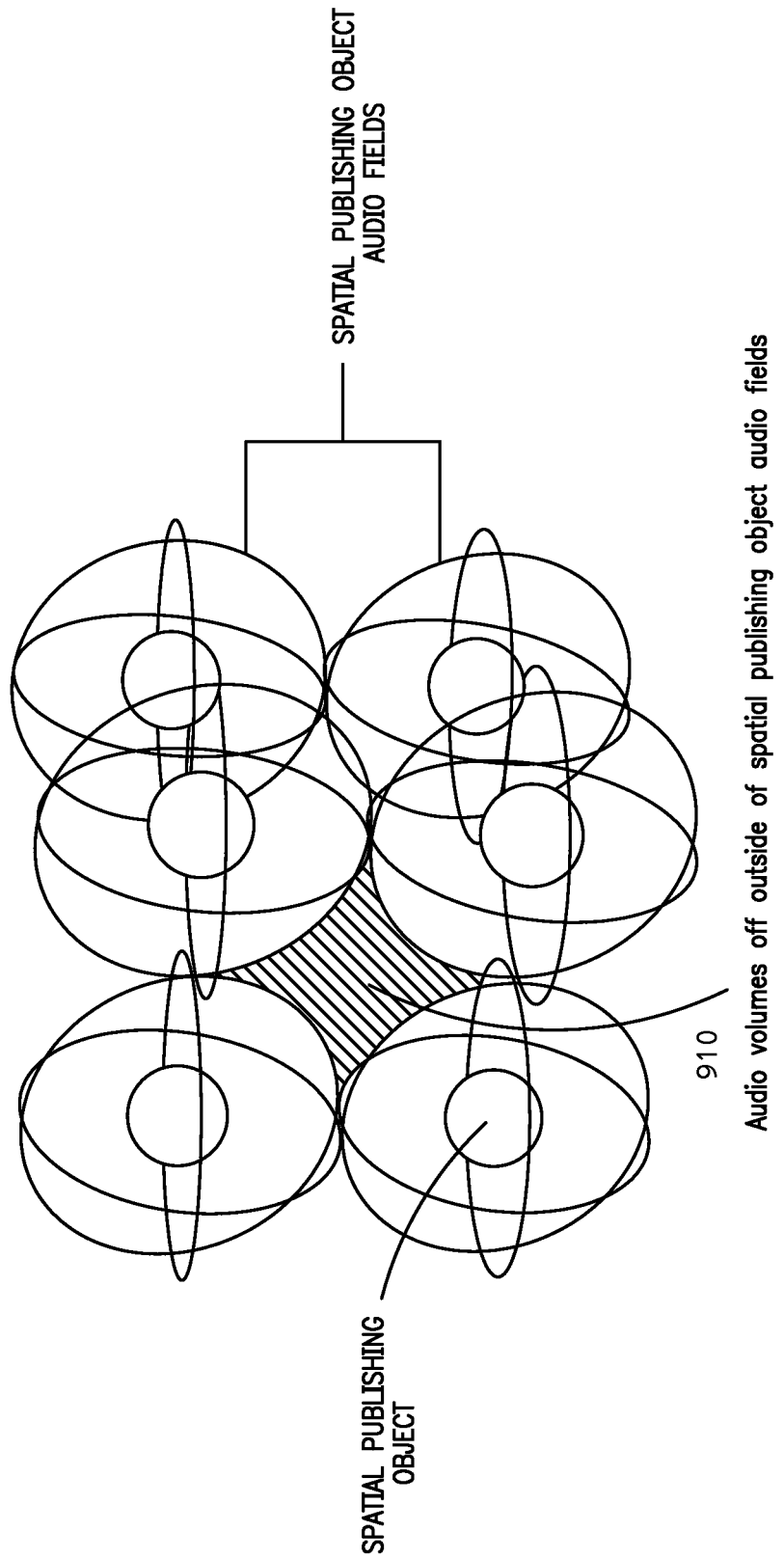
FIG. 9 illustrates audio characteristics of embodiments of spatial publishing objects within the technology of the present invention.

In some embodiments, a spatial publishing object's audio field radius and fade profile are settable, e.g., by a user. Referring to FIG. 9, certain settings can create quiet zones 910 between spatial publishing object audio fields. Some settings can create overlapping audio fields. For example, by doubling the audio field radius of all the spatial publishing objects in a SPO space containing many audio publishers of a conversational nature, a situation not unlike walking through a crowded room is created for the user as the SPO space is traversed. In another example, the audio radius of a select group of spatial publishing objects publishing independent instrumental or other musical parts is increased so that all are contained in each other's audio fields in order to create a mixed output. This is the typical audio setting of a communication space arranged to connect several friends. To this end, in some embodiments, the technology's browser/file management program (in preferred embodiments running on the user platform) includes a mixer panel to assist the user in controlling audio outputs from spatial publishing objects, including multiple channel output upon execution of a connect command. Although a spatial publishing object's audio is considered monolithic in terms of its initial audio field and volume characteristics, all standard home entertainment center formats are available for output, including but not limited to mono, stereo, and 5.1 surround, as well as for the overall system output of the program itself.

Figure 11:
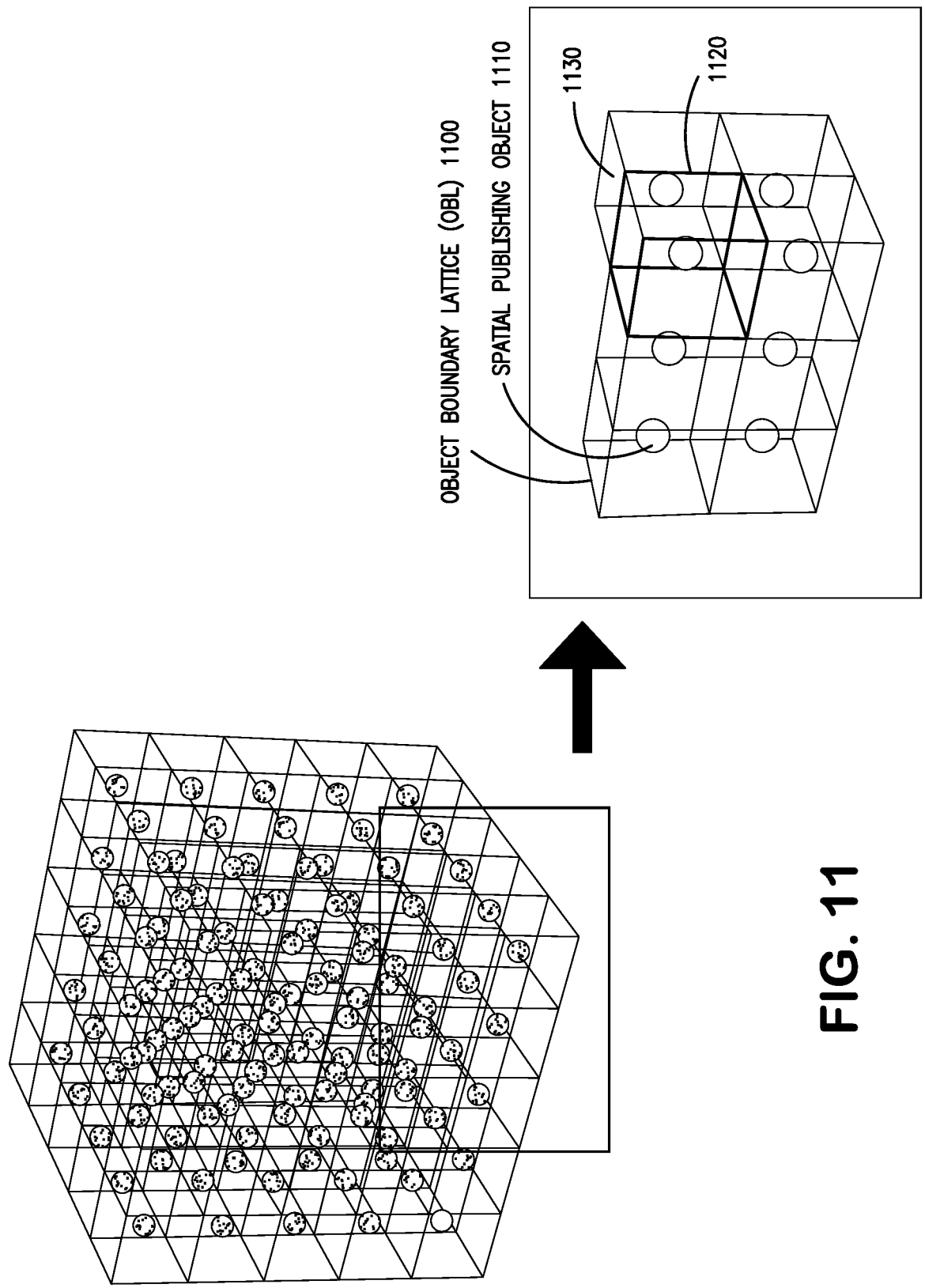
FIG. 11 illustrates an object boundary lattice of the present technology.

In some embodiments, particularly those with spatial publishing objects ordered in the SPO space on a regular 3D matrix, proximity operations such as select spatial publishing object are based on an Object Boundary Lattice, Referring to FIG. 11, a spatial publishing object boundary lattice (OBL) 1100 is shown. For SPO spaces with spatial publishing objects 1110 ordered in a regular 3D matrix, the OBL is a geometric cubic matrix, made up of individual cubes 1120 bounding each spatial publishing object 1110, at specific 3-dimensional coordinate vector points, or vertices 1130, which determine proximity selection for the current spatial publishing object if the user presence is contained within the bounding cubic area of that spatial publishing object as mapped out by the 3-dimensional geometry of the OBL, establishing the concept of the currently-selected spatial publishing object as the supplier of media and information to the video display and audio output systems, along with any additional remote spatial publishing objects which can be providing media and information based on a connect with the current spatial publishing object. In some embodiments, audio fields are described by the OBL as opposed to a spherical audio field as described herein.

A user can connect with audio and video channels of a spatial publishing object. Connect provides a link for both content and control/status information that can persist when the user presence leaves the proximity of a connected spatial publishing object or otherwise de-selects a spatial publishing object. One or more users can connect with the presence of a master or lead user, thereby causing the users connected to the master/lead to view the SPO space from the presence/POV of the master/lead (as opposed to from a POV coincident with that user's presence), including viewing and hearing those spatial publishing objects viewed and heard by the master spatial publishing object. By connecting to lead, the lead's movement, actions, and spatial publishing object selection queries are broadcast to the group so that all members of the connect are visually seeing the same spatial publishing objects on their individual display screens.

Each individual media stream, be it audio or video, can be thought of as a self-contained object inside a wrapper of metadata. This metadata can contain information about the rights holders of the media, as well as other information about the media such as location, crew, creation date, modification history, and technical information about the specific media itself. As media is accessed or created in real time from live audio and/or video input for any given spatial publishing object, information is requested from the spatial publishing object by the software application, and the associated metadata stream is logged and saved in a database for later reference based on the time of day broadcast occurred.

In some embodiments, a configurable permission structure and underlying metadata-based tracking and scheduling platform for media published on a spatial publishing object, including conditional access authentication procedures such as password protection, allows publishers to control access to their published media using copy protection and digital rights management, and can accurately determine usage of published media for the purposes of using subscription, pay-per-view or pay-per-download, or advertiser-supported methods of revenue generation.

Day indexing can be calculated as an offset from the inception date of the spatial publishing object publisher database. While the metadata associated with media streams is continually being stored on remote application database servers, the actual streaming media itself is only stored if it was recorded or downloaded by the user in the past to the local client system, and is otherwise preferably stored by reference. Appropriately permissioned and available content can be re-accessed for playback after the fact, depending on each publisher. After selecting a spatial publishing object, content is retrieved by entering calendar mode, similar in appearance to a two-dimensional display mode, in which days and months and specific published events can be selected through cursor movement in order to go back to a spatial publishing object view of a past day. It is also possible to look into the future, but only to view metadata, like a program guide, of future spatial publishing object publishing, if a publisher provides that information.

"External" when used with regard to a spatial publishing object includes communication on the surface of the spatial publishing object or in a separate portion of the user interface (described herein), e.g., display of metadata, and video, and communication in the spatial publishing object's proximity field, e.g., playing audio. The external appearance of a spatial publishing object can indicate its state, where states include: on, off, and private. States can be indicated by the exterior color of the spatial publishing object. Spatial publishing object size can be used to indicate attributes such as the number of users that have e.g., selected or connected to the spatial publishing object over a period of time. Referring to FIG. 1, a spatial publishing object can externally display video, photos, or text in a screen-like inset called the spatial publishing object window 140.

Although one appearance of a spatial publishing object is that of a simple sphere fixed in SPO space, spatial publishing objects can move (e.g., SPOs associated with other users who are navigating the same SPO space) and also take on other forms, e.g., anthropomorphic or otherwise, possibly including lip-sync and other animation forms, that are facilitated by an open programming interface, as well as a library of alternate spatial publishing object models. This open model for spatial publishing object visualization allows the complexity of spatial publishing object models to scale to improvements in computer network bandwidth, CPU performance, and 3D graphics rendering speeds over time.

A user can externalize a spatial publishing object's internal organization within the spatial publishing object space through the open spatial publishing object command. Open spatial publishing object creates a view of a new SPO space based on the query data inherent in the currently selected spatial publishing object, allowing the user to drill down within a spatial publishing object to possibly find other spatial publishing objects in another SPO space. For example, opening a music SPO leads to albums, leads to songs; or opening a hobbies SPO leads into the hobbies space which includes a team SPO that when opened leads to a teams space having a basketball SPO, that when opened leads to a basketball SPO space including a SPO for the user's favorite team. In some embodiments, a keyword within the data inherent within the spatial publishing object can be empowered with the ability to trigger specialized software controls, interactions, and display formatting to better represent specific publishing topics such as music, user groups, sports, news, advertising, financial markets, and entertainment. A spatial publishing object's internal organization can include individual communication channels and other spatial publishing objects.

Figure 14:
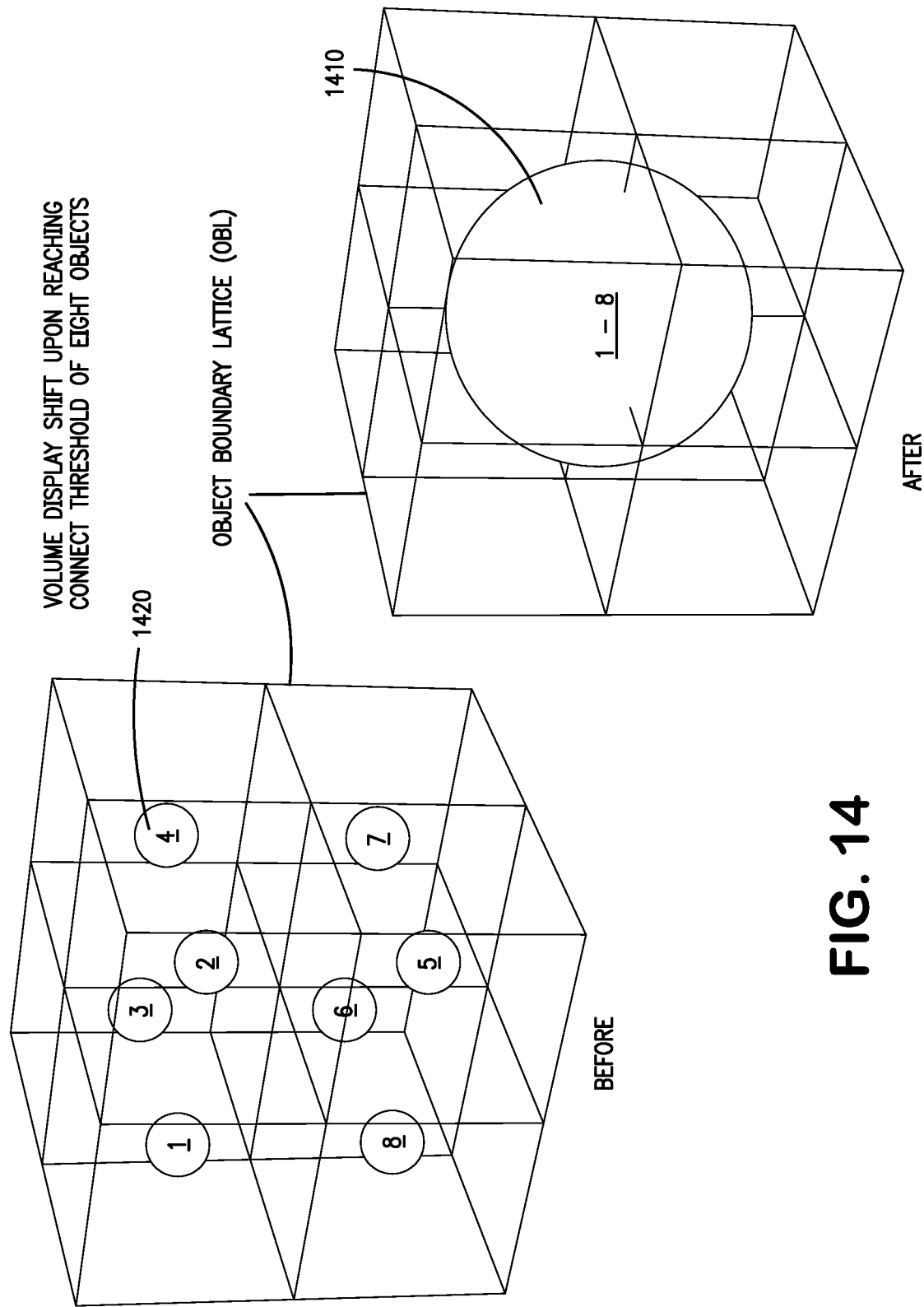
FIG. 14 illustrates a volume display shift in the context of an object boundary lattice of embodiments of the present technology.

With professionally published content, such as films and music concerts, it is envisioned that groups of connected spatial publishing objects could grow to be quite large. Referring to FIG. 14, the number of connects to a spatial publishing object, designated as a master (see below) of the connect group, can be indicated by the size of this master spatial publishing object 1410 in the spatial publishing object space, and can be related to the number of unit-sized spatial publishing objects 1420 displaced. In some embodiments, a first size threshold is eight spatial publishing objects as shown in FIG. 14. When the number of spatial publishing objects 1420 reaches eight, a larger spatial publishing object 1410 appears, filling the SPO space previously occupied by eight unit-sized spatial publishing objects. In some embodiments, size thresholds follow the cubes of the positive integers, starting with $2^3$ or 8, followed by $3^3$, or 27, $4^3$, or 64, etc.

The master spatial publishing object of a connected group of SPOs in a SPO space can be by default the first object to initiate a connection to a second SPO. However, if and when another connected SPO within the connect group has more direct connections to it, it could automatically become the new master SPO of the connection group. In small groups with more one-to-one type connections versus many-to-one, the master or leader of the group can be chosen thru consensus by the members of the connected group of SPOs in the spatial publishing object space to manually change the default master SPO status.

In reference to a spatial publishing object, "internal" includes a communication space, variously referred to in the Provisional Application as a "CommUnication SPace" or "CUSP." A communication space is entered when a user directs an enter communication space command through the user interface (variations to be described in greater detail herein), e.g., after creating an explicit communication connection between the user's SPO and this currently selected spatial publishing object in the SPO space by executing the connect spatial publishing object command. In some embodiments, entering a communication space causes the communication space to be displayed outside the context of the SPO space, e.g., a communication space can be three-dimensional or two-dimensional in the fashion of a conventional Web page.

Figure 6:
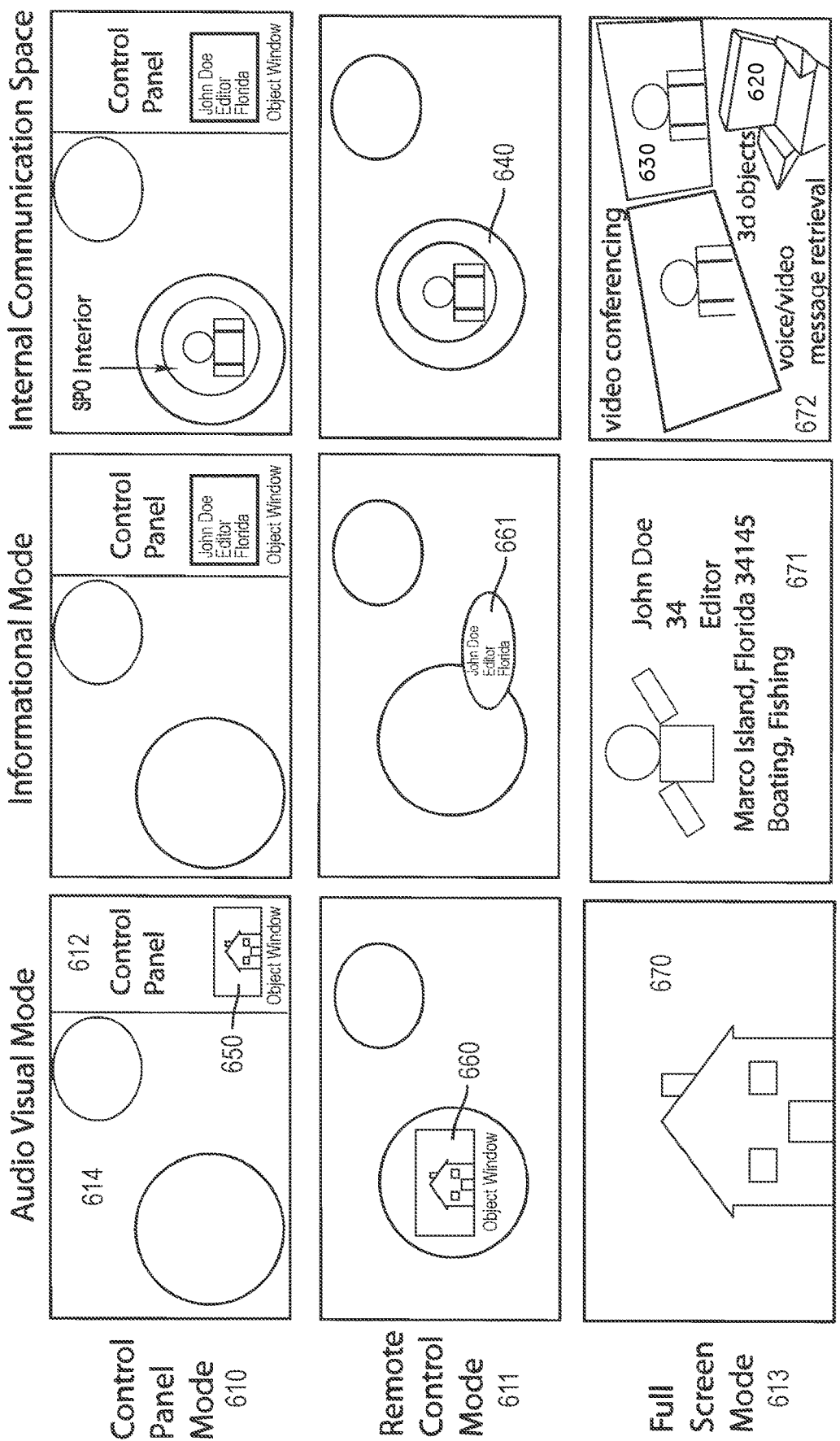
FIG. 6 illustrates control and display modes of embodiments of the present technology.

As an example, in particular embodiments, audio visual feeds from the currently selected spatial publishing object, and any spatial publishing objects connected with this spatial publishing object are mapped onto at least one interior portion of the entered communication space. Referring to FIG. 6 and FIG. 10, these can all be simultaneously presented, take for example a quad split, e.g., 1010 or a revolving display around the spatial publishing objects internal surface 630, or sequential in nature, such as tracking the image of the current speaker, e.g., 640 in a multi-party conversation or discussion. With the addition of lower-third title graphics overlay based on spatial publishing object information, a means for creating a dynamic form of talking head television or talk radio style programming is enabled.

Communication spaces are customizable with additional items, e.g., furniture 620 and 1020, through content uploads on the application portal website, new software creation, or with purchases from the portal online store of textures, pictures, videos, music or other audio, and 3-dimensional items such as furniture and characters to create a custom communication space, user configurable based on an open software application programming interface (API). In some embodiments of the technology, the SPO space is discernable from within the communication space, e.g., as an outer space via a transparent or translucent spatial publishing object boundaries, or portion of such boundary as via, for example, a window or other portal.

After a user chooses to enter a communication space, the interior 3-dimensional space of the spatial publishing object in question becomes visible, i.e., the enter communication space command reveals the internal structure of the SPO entered. The user, in effect, travels inside the spatial publishing object, and can navigate within the communication space, e.g. 1080. Users outside the communication space yet in a SPO space including this spatial publishing object can watch the conversation on the spatial publishing object window without necessarily connecting if the spatial publishing object publisher allows. Users can also watch the conversation through the interior command disclosed herein.

A user enters the communication space of their own spatial publishing object to simultaneously or sequentially view the gathered visual material from connected spatial publishing objects out in SPO space in a convenient and custom-designed 3D environment of their own creation while also communicating with live voice channels. A default configuration exists, e.g., the interior of a sphere with a single television-like display area on the wall. Audio from connected spatial publishing objects is also present, as it was out in the SPO space. Users can also review their own media channels within their communication space. Users can be connected by default to their own spatial publishing object. The communication space represents a user-controlled and customizable space for communicating with and displaying visual information from their spatial publishing object connections.

Spatial publishing objects need not take visible, spatial form within a communication space. The communication space of a spatial publishing object can be a customizable 3D room, rooms, or environment arranged by the publisher of the object. Connected spatial publishing objects can display instead as live video streams in television-like monitors on the wall of the space for the purposes of video conferencing, or only be present audibly, via the live media channel of each spatial publishing object, depending on the decisions of the publisher of the spatial publishing object's communication space. The use of audio-only for spatial publishing object representation can be particularly relevant in the case of communication spaces containing a large number of connected spatial publishing objects where system performance becomes an issue. In these cases there might be no visible spatial representation of the spatial publishing objects, but a system for determining the underlying unique communication space position and ordering is in place in the form of the communication space DMAP.

In particular applications, inside a user's own communication space, voice or other messages left by other users who've attempted a connect to the user's spatial publishing object can be listened to. In some embodiments the messages are automatically placed in a play list on a designated channel of the user's spatial publishing object. Unanswered connect voice communications are recorded to the user's SPO media channel, to be listened to later, even if a spatial publishing object is in a "not publishing" state, or a "frozen" state.

Although communication spaces in some embodiments appear as the interior space of a spatial publishing object sphere, communication spaces can be implemented as a distinct enter to a separate software executable while incorporating dynamic data exchange to carry the spatial publishing object publishing streams currently connected in the original spatial publishing object along into the new environment. The new environment need not be limited to the simple interior sphere shape. An open programming interface specification allows third-party development of custom SPO communication spaces. In fact, the communication space spatial publishing object data encapsulation can become adopted as an industry standard protocol for passing communication publishing data groupings, spatial publishing objects, along from one application to another such as from the user browser/file management program to a third-party videogame, not just communication spaces specific to the user browser/file management program. In this manner, groups of users can remain in audio communication with each other as they move between different applications environments linked on a network.

One aspect in the design specification of the open programming interface for communication spaces, and in the establishment of industry standards for group voice and data passing between software applications at the communication space interface, is the notion of future application extensibility and recursion. Built in to the present technology is the capability of future-proofing and renewal. A connect rate for a spatial publishing object and its communication space can grow to include all spatial publishing objects existing in the original interface to the point that the original interface can eventually remain unused as all new publishing and communications take place inside this communication space. What remains consistent between the original interface and the communication space in question is the concept of spatial publishing objects and communication spaces, so that the new communication space contains spatial publishing objects and communication spaces and includes this possibility of in turn being eclipsed by a new spatial publishing object/communication space technology combination. This cycle can continue.

Figure 15:
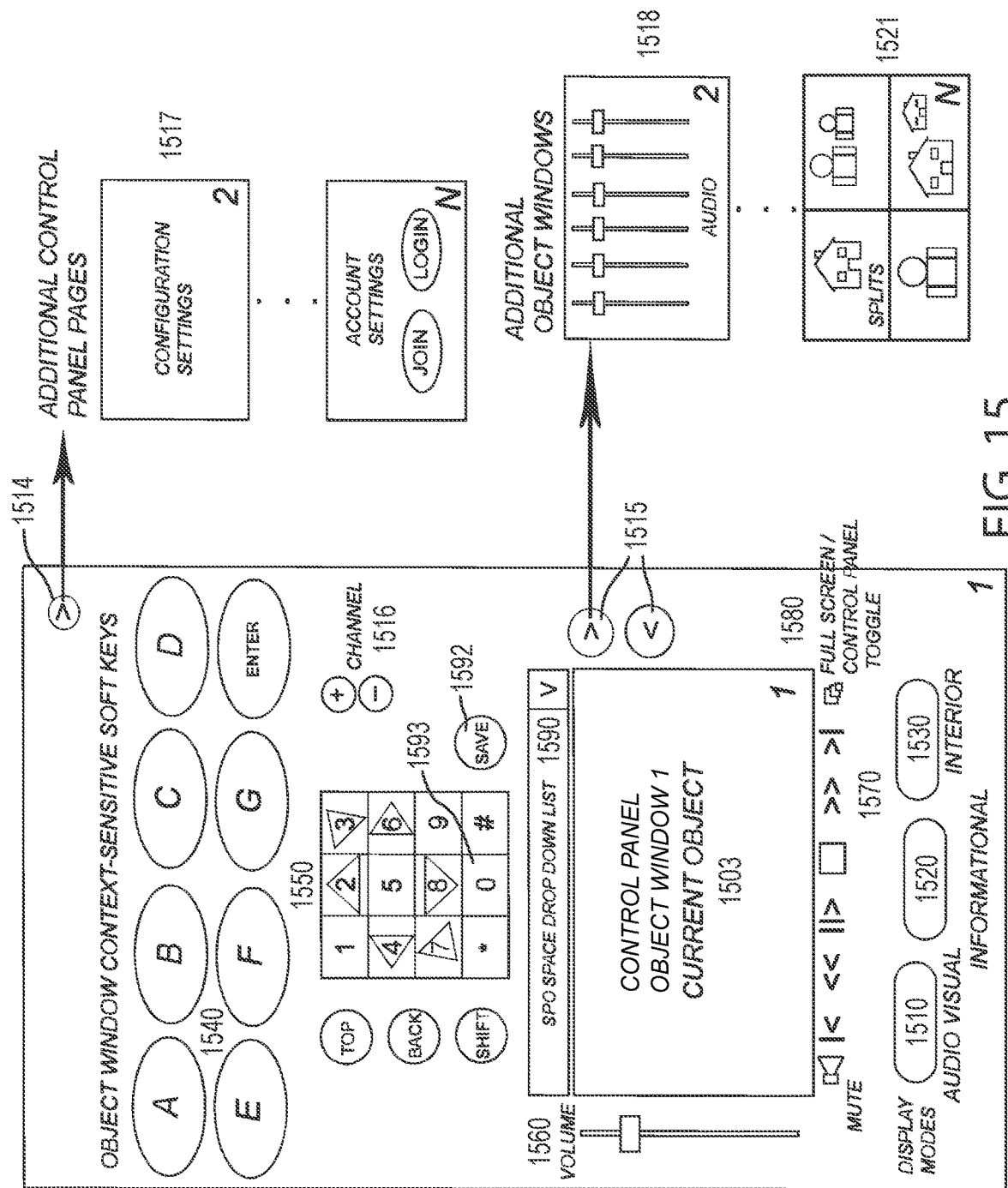
FIG. 15 illustrates a control panel of embodiments of the present technology.

The information communicated by a spatial publishing object can be in the form of a pre-ordered sequence of different media types, such as audio or video, or a combination of different types. The spatial publishing object publisher can decide to make this sequence or play list static or dynamic. If static, the sequence can play out without any user or user control. If dynamic, fast forward, reverse, pause, frame advance, segment skip ahead and back, and other common transport-type features are provided. Referring to FIG. 15, multiple channels for play lists are supported within a spatial publishing object, between which a user can switch 1516. In some embodiments, two channels that come as a default on each spatial publishing object are, referring to FIG. 2, the incoming voice message channel 204b and the live user voice and video channel 204d for communicating with other spatial publishing objects. Standard hypertext transfer protocol (http) links to web pages are also supported on spatial publishing objects. When selected, the application launches the client computer system's browser program for web browsing in parallel with the client application.

Professionally-published content can also be available in spatial publishing objects, as well as commercial information. However, in some embodiments, the occurrence of commercial spatial publishing objects can be limited, e.g., in density, e.g., as defined by ad spatial publishing object count per volume.

Figure 5:
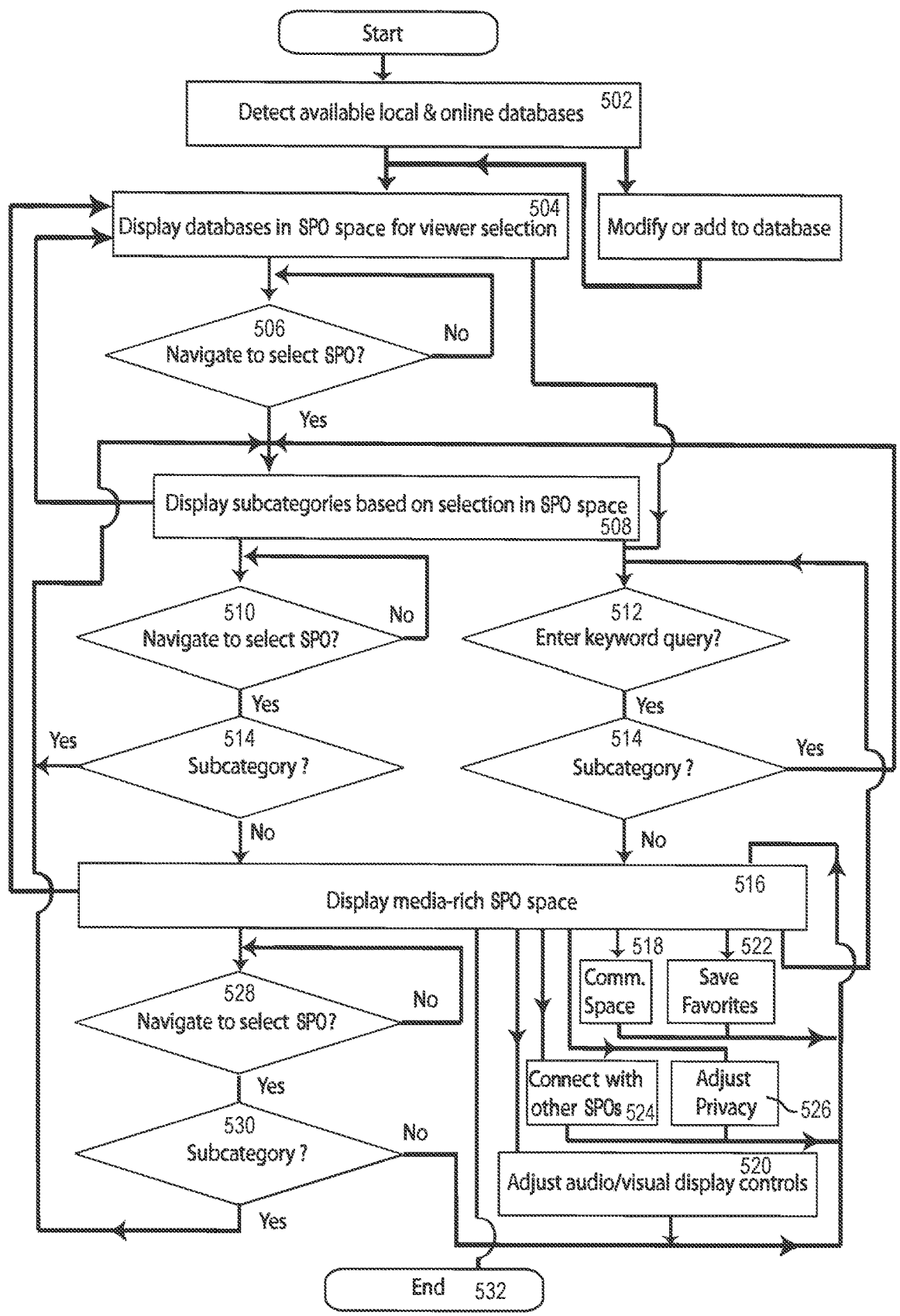
FIG. 5 illustrates a method of operation of embodiments of the present technology.

FIG. 5 is a flowchart illustrating an embodiment of a program control logic scheme for the present invention. After detecting 502 and then display 504 detected databases to interact with at program start, a user can navigate to select the information source(s) 506, each represented as a spatial publishing object. Subcategories contained in the spatial publishing object are then displayed 508, also in spatial publishing object form, to guide the user in the direction of interest. These subcategory spatial publishing objects can be navigated to 510 and selected, or an immediate keyword query can be entered 512 to display a more specific set of spatial publishing objects. The search could return more subcategory spatial publishing objects 514 based on the information in the spatial publishing object selected or keyword entered, or it can return media-rich spatial publishing objects 516. If spatial publishing objects exist which contain media channels to satisfy the user selection or query, additional functionality can be employed such as creating communication connections 518 and controlling audiovisual display 520. The user can also save lists of favorite objects 522, connect to or enter spatial publishing objects 524, and adjust access controls 526. This cycle can continue indefinitely as the user enters additional keyword queries and navigates to select other spatial publishing objects 528 or subcategories displayed 530 in spatial publishing object form, before exiting the program 532.

Visual information from the spatial publishing object can either be on the surface of the spatial publishing object, e.g., as described above, or directed to a designated area of the display screen, and can shift with each change in user presence within the SPO space to reflect the communication of the current spatial publishing object, as the user presence moves through the SPO space, which can be a live video input of the spatial publishing object publisher such as from a webcam, any film or video footage, or other information.

In order to navigate the spatial publishing object view display screen, users are presented with several options and different display modes. As with most modern software programs, keyboard and pointing device controls are enabled, in addition to infrared or other types of remote control. FIG. 6 and FIG. 10 illustrate various display modes of the technology. FIG. 15 displays a control panel of the technology, implementable as software on a display or as a physical remote control device.

In a first display mode, the control panel mode 610, the onscreen control panel 612 appears on the right side of the display screen, leaving the left side open for display of the spatial publishing object matrix 614, and is designed to mirror the functionality of the optional handheld remote control shown in FIG. 15. The initial onscreen control panel can be paged 1514, 1515 to bring up other control panels, e.g., 1517 for setting user preferences and account settings, audio control 1518, 1016, such as mixing and processing, video control 1060, 1521, such as Picture-in-Picture and Splits setup, and other management features. Commands can be executed either by clicking the corresponding button on the display with the pointing device, or by using keyboard or handheld remote equivalents. In addition to a display mode, the user can choose between the information type options. An AUDIO VISUAL information option or button 1510 sends video published from the current spatial publishing object to the control panel object window 650, 1503 in the onscreen control panel. The INFORMATIONAL button 1520 draws information from a spatial publishing object's information data, such as the name of the publisher and the title of the media on display, to the same control panel object window area. The INTERIOR button 1530 allows a user still in the SPO space to look inside a spatial publishing object, if allowed by the publisher, to see the communication space inside. Each of these three information display buttons selects a current information display state, to be changed by choosing one of the other two buttons.

In a second display mode 611, the onscreen control panel can be hidden except for the playback transport controls to obtain maximum visibility of the spatial publishing object matrix. In this case the keyboard or remote control can be employed to execute most user commands. The AUDIO VISUAL information button 1510 in this display mode positions video display in an actual window on the spatial publishing object, the spatial publishing object window 660. The INFORMATIONAL button 1520 triggers a popup menu 661 to appear near the spatial publishing object, semi-transparent, with the information data of the current spatial publishing object. The INTERIOR information state button 1530 has the same effect as in display mode one, namely creating a transparency 640 within the surface of the spatial publishing object sphere through which a user can see the into the SPO's communication space.

A third display mode 613, 1040, full screen mode, occurs when a user decides to expand the currently selected object window, either the current spatial publishing object window or the control panel object window, to cover the entire display screen. In all screens the playback transport controls are available, which include the display mode toggle between the first three modes, but the controls fade off in full screen mode if not being used, to reappear by touching any control or moving the current position. The AUDIO VISUAL information button 1510 here provides a full screen video playback 670 or can provide a larger screen area for working with audio and video setup controls from the control panel object window, while the INTERIOR button 1530 is inactive. Spatial publishing objects can be switched between in full screen video mode by employing the skip-to-previous transport commands. The channel buttons 1516 can switch between available channels within a spatial publishing object. The INFORMATIONAL button 1520 provides a full screen display of the information data associated with the spatial publishing object 671, but can additionally go active in a full screen web browser if a publisher provides a web address (URL) in the appropriate field in the spatial publishing object database.

A fourth display mode 672 communication space can be accessed through a dedicated control or through a programmable, e.g., soft, button 1540. The fourth display mode occurs when a user chooses to enter a communication space, e.g., by pressing the communication space button 1540. The display can vary greatly depending on the custom communication space configuration of each spatial publishing object.

The onscreen commands include cursor movement control along with specific action command soft keys 1540, alphanumeric keypad 1550, and audio volume 1560, transport 1570, and display mode control 1580. The two, four, six, and eight keypad 1550 buttons can function as forward, left, right, and back cursor movement controls to enable the traversal of spatial publishing object views, unless an alternate command mode is entered such as FIND, e.g., enabled by a soft key 1540. The FIND command enables the keypad for alphanumeric entry of a search query to create a SPO space filled with spatial publishing objects satisfying that search criteria. This SPO space title is entered and displayed in the spatial publishing object view template window. Alternately, the drop-down master list of SPO spaces 1590 can be activated at the right side of the window to enable the selection of a pre-existing SPO space. After a FIND has been executed to create a new SPO space, this new SPO space can be saved into the master list with the SAVE button 1592 beside the SPO space window 1590. Transport commends can include play/pause, forward, reverse, skip to next, skip to previous, and stop. Within the communication space, a user can terminate an active connect to another spatial publishing object's live media channel by selecting that object and issuing a stop command.

Pressing or otherwise selecting ENTER opens a new SPO space based on the query data inherent in the currently selected spatial publishing object, allowing the user to drill down within a spatial publishing object to possibly find other spatial publishing objects, such as MUSIC leads to ALBUMS leads to SONGS, or HOBBIES leads to TEAMS leads to BASKETBALL leads to spatial publishing objects of other team members.

Individual spatial publishing objects can also be saved near the origin of a particular SPO space for easy access by using the Favorite command while on a particular favorite spatial publishing object. The origin can be reached by pressing the 0 key 1593 on the keyboard or remote control, or selecting it on the onscreen controller. When the 0 key is pressed, the display can rotate around to the spatial publishing object currently in the [0, 0, 0] matrix position. Favorites can be saved along the left-most plane of spatial publishing objects, in coordinate terms [0,Y,Z], by executing the FAVORITE command, e.g., enabled by a soft key 1540, and can be set to be on or off in program configuration preferences.

The FACE mode 1050 command, or soft key 1540, executes a simplification of the current SPO space, essentially dropping the interface view down to two dimensions to facilitate simple left, right, up, and down cursor movement through spatial publishing objects. Conventional 2D features such as drag-and-drop are available in this mode. This mode is particularly appropriate for smaller, mobile user platforms that lack sophisticated positional input devices for traversing the 3D SPO space. It is also useful for viewing the FAVORITE plane of spatial publishing objects which is 2-dimensional since it lies on the far left of the spatial publishing object view matrix. Conventional 2D features are available in embodiments of the present technology.

A feature of the social interactivity of spatial publishing object view is the connect command, enabled by a soft key 1540. When the connect command is activated, the audio component of the current spatial publishing object is linked to the spatial publishing object user's audio to enable conversation. Further traversal of the current SPO space or other SPO spaces can continue, allowing a shared experience while moving through other spatial publishing objects. A spatial publishing object must be open to connection, or to entry of its communication space, e.g., indicated by a specific color, such as green, in order to connect or enter. A closed condition can be indicated by a spatial publishing object taking a different specific color, such as blue, and can be executed by using the Freeze command, e.g., via a soft key 1540. In the FREEZE state, users and other spatial publishing objects are unable connect to a frozen spatial publishing object. A spatial publishing object can be frozen after other users or spatial publishing objects have connected in order to create a private or contained group. The FREEZE state does not indicate that publishing of audio or video stops from the frozen spatial publishing object. That is another state that can be indicated by a third SPO coloration such as gray. It simply means that no other users or spatial publishing objects can connect.

In some embodiments, a user must connect to a spatial publishing object before the enter communication space command can be used. By executing the enter communication space command, connected users pass through the open interface specification into the custom, or default, inside of the current spatial publishing object. The communication space interior may be the default interior sphere shape or something completely user generated by the current spatial publishing object publisher.

Inside a user's own communication space, voice messages left by other spatial publishing objects who've attempted a connect to the user's spatial publishing object can be listened to, since the messages are automatically placed in a play list on a designated channel of the user's spatial publishing object. Unanswered connect voice communications are transferred to the client's storage, to be listened to later, even if a spatial publishing object is in a not publishing, e.g., gray, or a frozen, e.g., blue state.

The present technology may be implemented using hardware, software or a combination thereof and may be implemented in a computer system or other processing system. Referring to embodiments illustrated in FIG. 3 and FIG. 4, a client 420-server 410 topology, or any other suitable topology, may be employed. Client computers 318 can be personal computers 319, mobile telephones 320, game consoles 322, Personal Digital Assistants 324, or other digital devices 326. These devices can contain a processor, random access memory, graphics display hardware, and either a display screen 434, 321 or output connections for an external monitor. For non-volatile storage, e.g., 426, these devices may contain hard disk drives, Flash memory, or some other form of high-density random access storage.

The user platform tuner/browser application can be written predominantly in an object-oriented programming language like C++, or other suitable programming language to enable the real-time features of audio mixing, 3D graphics, and video playback, though portions of the user interface could also be coded in modern languages like Python or Ruby. SQL-type, or other suitable database software can provide the server functionality, and could be accessed, for example but without limitation through calls from scripts running in a standard web browser.

Figure 3:
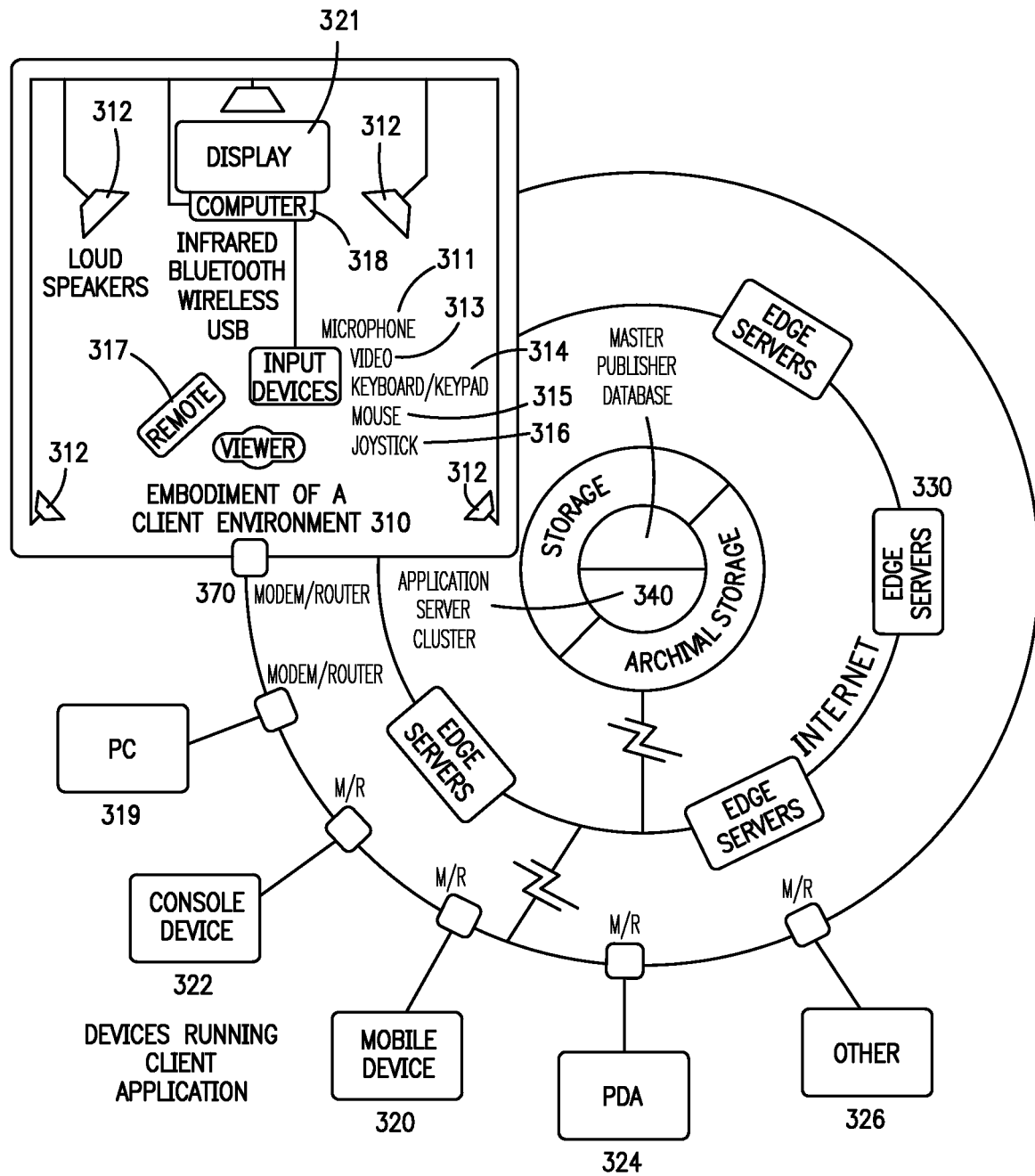
FIG. 3 illustrates a network context of embodiments of the present technology.

Referring to the embodiments of FIG. 3, the client environment 310 also can contain microphone audio input hardware 311, and audio speakers 312. Video input 313 capability is supported but optional. In addition, each device could include keyboard/keypad input 314 and cursor control through a positional input device of some type such as a mouse 315, trackball, joystick 316, keypad, or handheld remote control 317 any of which can communicate with the computer using infrared, wireless 8.0211a/b/g/n, WiMax, USB, Bluetooth, serial, Firewire 1834, or another communication standard.

For expandable computer systems such as a personal computer, devices such as CD or DVD burners may also be employed to record, copy, or backup published media if digital rights are obtained. Published works existing on removable media such as CDs, DVDs, Flash Drives, and game cartridges may also be read by the browser-like client software if the appropriate hardware is present.

The client computer could connect to the network through a communications interface such as an Ethernet network interface card, modem, WiMax or wireless 8.0211 a/b/g/n interface signal utilizing a router 370 allowing connection to a cable, telephone, satellite/telephone combination, or cellular Internet Protocol network through RJ-11 or RJ-45 twisted copper pair wire, coaxial cable, optical fiber, or RF signal.

A network included but not limited to the Internet or the worldwide web of interconnected server computers communicating via TCP/IP could be employed to route communication and signals back to the application database host servers 340, employing caching edge servers 330 along the way to minimize transmission delay. A protocol such as Session Initiation Protocol (SIP) can be used to enable voice-over-internet-protocol (VOIP) communications.

Redundant server computers can contain a processor and random access memory, and can be connected to the network via a network interface card. In addition, the servers can be connected to RAID or other hard disk storage.

The client-side application can reside on the local client computer's non-volatile memory until executed by the user, at which time it could load into system RAM until terminated by the user. The server-side application can be located on the network RAID or other storage connected to the application servers. After initial execution, the clustered and load-balanced servers could run the server-side application on a continuous basis to provide 24/7 access to the global user community for registration, media server, online store, and database search functionality.

Data for each spatial publishing object in a SPO space can reside initially in the spatial publishing object database. In a client-server configuration, this is at the server or some other location remote to the user. For example, in the case of live audio or video content, what can reside on the server database may be the address to the live stream, rather than the stream itself. Live media streams can be input by publishers and linked over the Internet to their spatial publishing objects within a SPO space via the appropriate addressing link in the spatial publishing object's database record.

Software at the user platform can employ a Dynamic Memory Array Pages (DMAP) architecture, loading into the user platform random access memory (RAM) data for spatial publishing objects within a range of the current user presence of the current SPO space, e.g., using background processing. In some embodiments, the number of spatial publishing objects having information buffered in local RAM is not absolute, but instead is calculated based on a set percentage of the available system RAM so that systems with larger amounts of RAM can buffer more information on spatial publishing objects of the current SPO space. The technology includes various approaches for selecting which spatial publishing objects near the user presence can have data cached on the user platform, including spherical fields and the Object Boundary Lattice described herein.

In some embodiments, the browser-like client application software is written in a multithreaded manner to make use of multi-core CPUs in order to more efficiently execute DMAP buffer filling as a background process.

In some embodiments, where spatial publishing objects are ordered in the SPO space in a regular 3D matrix, starting with the spatial publishing objects nearest the user presence, and radiating outward, e.g., uniformly in all directions, e.g., to create a cube, spatial publishing object data is fetched from the spatial publishing object database (or in the case where the database links to the data, via the spatial publishing object database) over the communications network, e.g., the Internet, into the local application's DMAP allocated in client system RAM up until the limit of the previously calculated memory allotment is reached.

For a regular 3D matrix, in some embodiments, the layers of the DMAP cube (or other suitable structure) are completed on all sides for indexing purposes, so to buffer one layer surrounding the current spatial publishing object would require adequate memory for twenty-seven spatial publishing objects. Buffering out three layers would require adequate memory for the information of 343 spatial publishing objects, the formula being $(2N+1)^3$, where N equals the number of layers surrounding the current spatial publishing object position on each side.

In addition to each spatial publishing object's information, published audiovisual material for each spatial publishing object may also be buffered in the DMAP, e.g., in the form of a texture bitmap or dynamic buffer for real-time media. Each spatial publishing object view contains multiple spatial publishing objects modeled in 3-dimensions, in embodiments of the present technology, for perspective display on a flat display screen surface.

Publishers can decide between various formats for the visual output of their spatial publishing object: video, html page, photo, and others. In order for the spatial publishing object visualizations to be drawn on the spatial publishing objects in the spatial publishing object window, in most cases they are first converted from their native format into a bitmap for application as a texture map to the spatial publishing object by the graphics engine. A modular input stage capable of interpreting input formats can precede the entry of a spatial publishing object's texture map into the DMAP. As the user traverses the spatial publishing object view, each individual spatial publishing object visualization changes appearance in response to the shift in viewing angle. The technology's 3-dimensional graphics engine handles the interpretation of user motion input into the corresponding screen redraw using each spatial publishing object's texture map to reflect the new viewing angle. The DMAP also uses the current POV information to dynamically adjust the position of all spatial publishing object windows to be viewable from the new angle.

Figure 12:
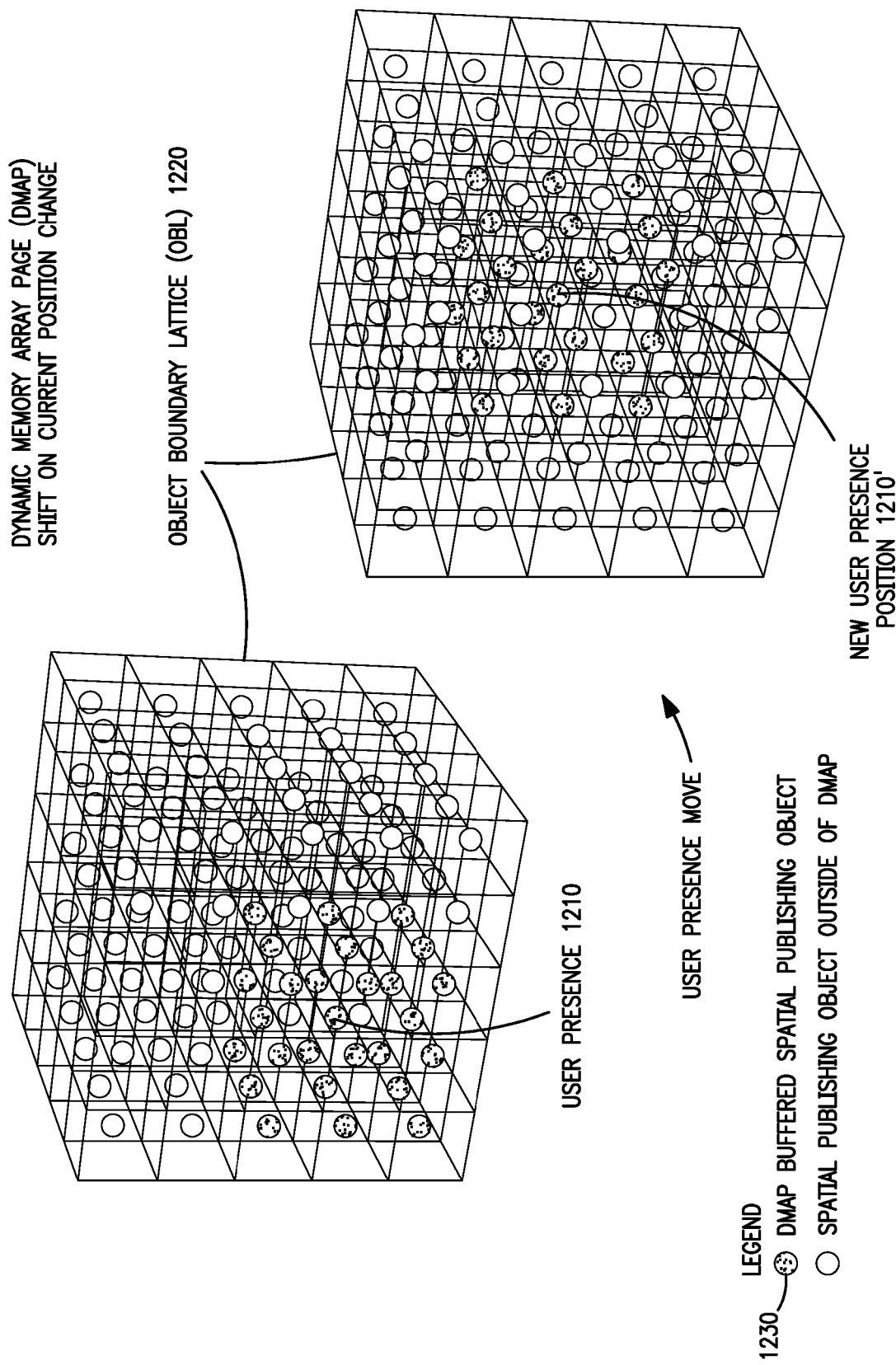
FIG. 12 illustrates a spatial publishing object space dynamic memory array page method of embodiments of the present technology.

Referring to FIG. 12, in some embodiments, e.g., some SPO spaces with spatial publishing objects positioned in a regular 3D matrix, DMAP refresh is triggered based on user presence 1210, 1210' in comparison to the spatial publishing object Object Boundary Lattice (OBL) 1220. Every time motion takes the user presence across an OBL boundary, the DMAP cube (indicated by the filled-in dots 1230) readjusts its indexing to reflect the new user presence position 1210' and begins buffering of the appropriate new spatial publishing object data without having to reload any buffered spatial publishing object data already in the DMAP. In some embodiments, only the spatial publishing objects in the DMAP reveal their visual components in their spatial publishing object windows on the display screen.

Several variables may affect the speed and efficiency with which the DMAP can be filled with spatial publishing object data, creating the opportunity for a unique feedback mechanism to be built into the DMAP. Internet bandwidth, daily network traffic patterns, connection times, client processor speed, number of threads and cores available, amount of RAM, rate of traverse, and amount and type of visual information per spatial publishing object in any given direction within the spatial publishing object view all have bearing on the load times for the DMAP. Since an objective is for users to move seamlessly through any SPO space, this feedback mechanism works by slowing down the speed with which the user can move through the SPO space in the direction of any as yet to be buffered spatial publishing object data. This aspect of the DMAP has the desirable effect of making faster client systems with more RAM and better internet connection bandwidth more responsive, while still providing a seamless experience for lesser systems.

Another feature of the DMAP is the method in which real-time data such as video or audio are buffered. Since these are real-time streams, once connection is initiated by the associated spatial publishing object being encompassed by the DMAP cube, circular buffers for the media data are employed and kept full, with current position pointer kept track of to allow an accurate presentation of audio or video data should the spatial publishing objects in question fall within audible or visual range during user traverse of the SPO space.

A communication space DMAP exists apart from the DMAP underlying the spatial publishing object space. This communication space DMAP is filled by the connections, e.g., those a user creates to his spatial publishing object while traversing various spatial publishing object spaces that are persistent across these spaces in preferred embodiments. Each audio connection can be user-controlled by bringing up the appropriate control panel window.

In communication spaces, audio presentation can be much more diverse since communication spaces are subject to an open specification, but in the default internal spatial publishing object sphere, a variation of the SPO space DMAP can be used. Real-time audio voice streams mix and can be equal in volume, with movement of a user presence optional, but since there need be no specific positional orientation for a user presence in the communication space, the default communication space audio array structure used to populate the communication space is a DMAP, a DMAP specifically for the communication space and independent of the SPO space DMAP. The spatial position of a connected spatial publishing object is pre-selected based on the order that users connect to the communication space.

Figure 13:
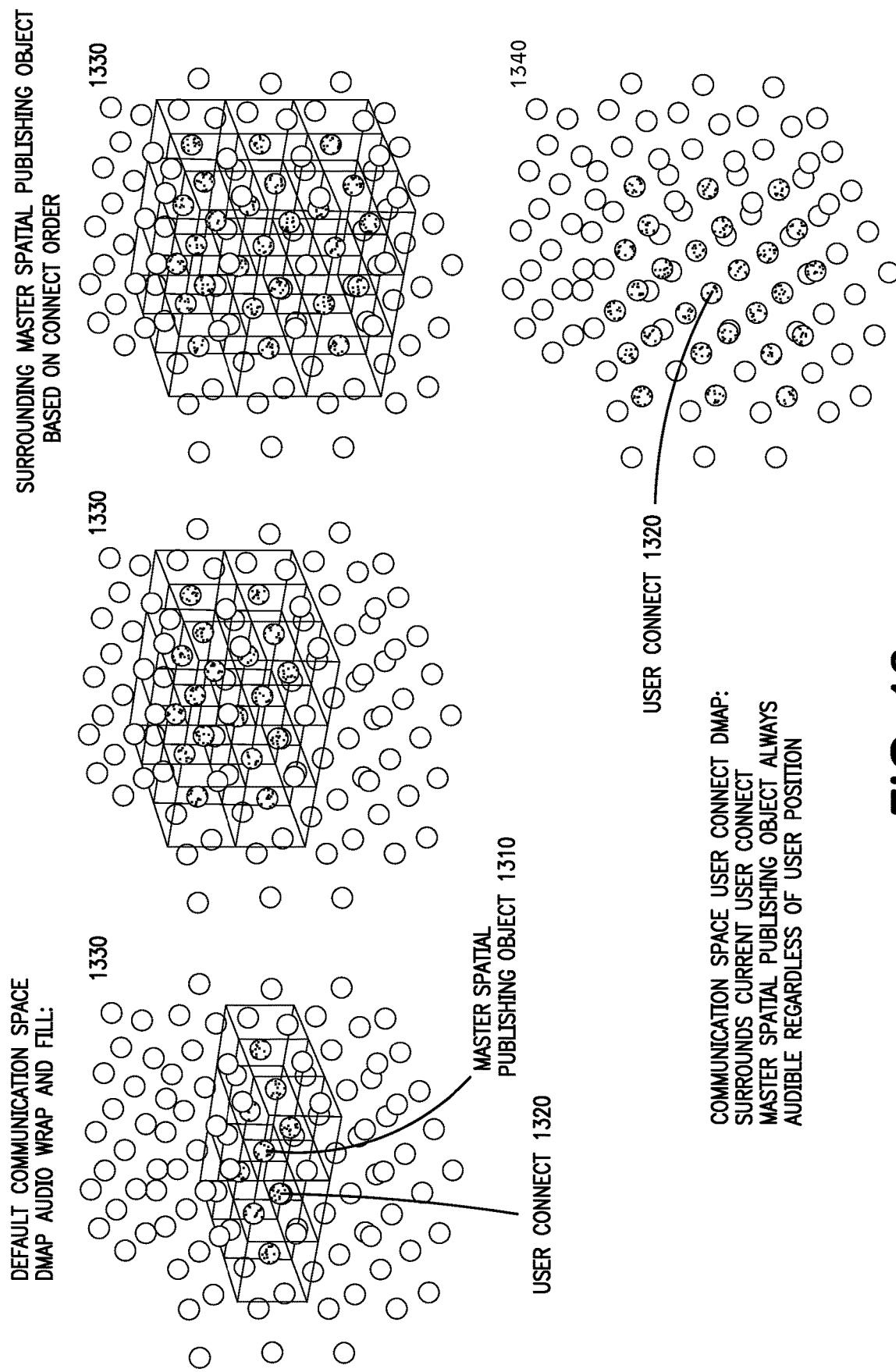
FIG. 13 illustrates a communication space dynamic memory array page method of embodiments of the present invention.

Referring to FIG. 13, this DMAP builds out from the communication space's spatial publishing object publisher, or master spatial publishing object 1310 in a wrapping fashion, first next to, then above, then below the master as exemplified by a user 1320 connecting to this SPO and assuming its position in the communication space array 1330. In the case of the communication space DMAP 1340 of the user SPO 1320, connected SPOs would instead build around this user SPO since it is the master in its own communication space. More memory and bandwidth can allow the user to have a larger DMAP to interact with more spatial publishing objects simultaneously in the communication space. The master spatial publishing object in the default audio setting can be heard by all users in the communication space, whereas users can be limited initially to hearing the master spatial publishing object audio and only the audio from the users surrounding their spatial publishing object according to the allocation of the communication space DMAP of the master spatial publishing object and the size of the DMAP of the client system in use.

A useful analogy is to think of the concert setting, where the performance on stage (master spatial publishing object) is loud enough for the entire audience to hear, but an audience member can otherwise only hear the other audience members in the immediately vicinity. Of course, since user audio parameters are variable, only the default setting is being referred to here.

The present technology offers utility in a wide variety of applications. In some embodiments advertising objects and advertising on existing spatial publishing objects is enabled.

In some embodiments, that advertising is limited to a certain density per region. However, this restriction is relaxed for spatial publishing objects that achieve high select, connect, or enter thresholds, meaning spatial publishing objects that have many viewers connected to them. Advertisers are allowed to pre-bid payments on an exchange hosted by the site for certain levels of viewers per minute and total viewer's selected, connected, or entered, related to specific publishing categories and viewer demographics, so that winning bids result in advertising taking place, in some embodiments automatically, on spatial publishing objects surrounding large spatial publishing objects which are growing due to a high select, connect, or enter rate. This creates a gauntlet of ad spatial publishing objects surrounding the popular spatial publishing object in question that users pass through on their way in to connect or simply view the large event. Ad placement can also take place within the spatial publishing object's communication space through insertion within audio or video, or as signs and banners on surfaces of a 3-dimensional interior of the communication space or on the exterior of the spatial publishing object. Revenue sharing arrangements can be a part of any spatial publishing object account.

In some embodiments, metadata stored from the published spatial publishing object includes information about the viewers and visitors to the spatial publishing object, e.g., viewers per minute (VPM), and total viewership (TV). Rates charged to advertisers can be based on actual number of users selecting, connecting to, or entering a SPO space or communication space.

One of the advantages of the technology is simplified access to individuals anywhere on the globe. However, language barriers can still exist. In order to lower these barriers and further simplify global communication, a special preference can be awarded to interpreters, e.g., by reserving the column front-most and left-most in the spatial publishing object view, in coordinate terms [0,Y,0], for individuals or groups who can speak multiple languages to aid in translation between spatial publishing objects. A special language selection-based search query can be directed specifically at these spatial publishing objects to allow a user to connect with the appropriate interpreter spatial publishing object before traversing a SPO space arranged with publishers speaking or broadcasting in a language which the interpreter is able to translate for the user. Favorite interpreters can remain for quick repeat access in the favorites area.

Users encountering explicitly connected spatial publishing objects during navigation, to which they themselves are not connected, might see a similar video broadcasting from each of the connected spatial publishing object's live input media channels, subject to privacy settings, should they happen to come across more than one of the explicitly connected spatial publishing objects in the same SPO space. This video could contain live video switching between the connected spatial publishing object's live media channel inputs, such as following the current speaker in a conversation. If the explicitly connected spatial publishing objects are not in the FREEZE state, the user could attempt an explicit connect, or could implicitly connect by remaining in proximity with the spatial publishing object. If any one of the explicitly connected spatial publishing objects (with appropriate privileges, e.g., appropriate access control of functionality) chooses to freeze connect access, all the spatial publishing objects in question enter the FREEZE state. Additionally, should the privacy status flags of any of the explicitly connected spatial publishing objects live input media channels be set for privacy, no live video or audio would be broadcast from any of the spatial publishing object's windows, but the live communication could still take place privately within the explicitly connected spatial publishing object's communication spaces and be displayed therein. This mechanism provides an option for private communication or public discussion between spatial publishing objects, either inside the spatial publishing object in a communication space or on the external spatial publishing object window. Each spatial publishing object within the explicit connect can display the similar live communication stream, subject to any display options chosen by the individual spatial publishing objects.

The explicitly-connected spatial publishing objects can choose to watch each other's live input during the course of the communication, or can individually move away from which ever one of the connected spatial publishing objects they were in proximity to in order to execute the explicit connect, and traverse the SPO space. Visual information displaying from a connected spatial publishing object stays behind as a user moves away from the object. An exception to this is the live media channel signal. After connection, and subject to privacy settings, any live video channel connections might display in an interleaved fashion, switching to follow the current speaker, on each of the live media channels on the connected spatial publishing objects, but still may only be seen if a user is in the proximity of at least one of the connected objects. Because of the connected state, each member of the connected could continue to hear the other connected members, but would need to move back into proximity of one of the explicitly-connected spatial publishing objects to see the communication on the live input media channel of that spatial publishing object. Therefore, each user in the connection group could be looking at very different SPO spaces while still conversing with the members of the connect group. In one embodiment of the onscreen control panel, each member of the connected group can be represented by an audio fader to allow control of the individual audio levels of each member of the connect group in each user's listening environment. Also included on a fader in the mix can be any new spatial publishing object audio playing back as the users traverse the SPO space.

New forms of video entertainment can be realized using the technology, particularly surrounding live cameras. By publishing a live video camera feed, in conjunction with the ability to converse, a user could connect to a live video channel of a spatial publishing object and direct the camera person in regards to the footage being viewed through the camera. The technology enables a whole group of spatial publishing objects to develop, camera jockey, or CJ, spatial publishing objects, which can allow users to connect to a CJ spatial publishing object publishing from a remote location, such as a vacation spatial publishing object, or a potential real estate purchase, in order to take a walk through with the user in command. By making interpreters easy to find in a SPO space, language need not be a barrier to using a CJ spatial publishing object, or to conversing with a spatial publishing object from any location in the world. Virtual tourism can be enabled by the technology in this fashion.

SPO spaces can be created in which users can be invited to participate. By entering, user spatial publishing objects can fill-in 3-dimensional templates to create 3-dimensional shapes within the SPO space. One example of this is the global template, in which each spatial publishing object is positioned by its GPS location to create the shape of the real world.

In another application of the technology, users can publish for broadcast on a channel on their spatial publishing object a stream of their own live audio voice and video image input, and based on a user interface software function, link or connect their spatial publishing object to other spatial publishing objects they move toward for selection in the spatial publishing object matrix for the purposes of live communication.

A SPO space can be used to conveniently display the publishing of stock market performers such as major indices or individual stocks so that users can monitor their financial portfolios. Meaningful color-coding of spatial publishing objects can be linked to real-time financial data input to create intuitive visualizations of the financial market for use in investment scenarios.

Simultaneous game feeds on different spatial publishing objects can allow easy switching between contests as well as simultaneous viewing of multiple angles and multiple contests.

The audio capabilities included with the technology make the spatial publishing object interface ideal for music publishing, for listening to music, and for playing music. Users can move among songs playing from spatial publishing objects or skip ahead to hear other songs on the same spatial publishing object, or automate the playback of music with the random passage feature. Video can be published with the songs for a music video experience. A command can sort published music into categories, so spatial publishing objects can be songs by an individual artist or band. Individuals can perform on their instruments from a spatial publishing object, and be connected to other players to create a duo, or a trio, or a whole band, with audio mix capabilities available on the mixer panel, so an audio engineer can also connect. Or two users could just hold a conversation and audition new or favorite pieces of music.

Musical performances can be published on a spatial publishing object, and as various connect thresholds are passed for a sought after performance, the spatial publishing object can grow to become more visible to other users, who in turn can move towards the large spatial publishing object and connect. Advertising spatial publishing objects can spring up around the successful spatial publishing object based on pre-arranged, viewer threshold-based agreements. Throughout, users in connect groups can hold conversations amongst each other, and when entering a communication space of the performance, can be situated in the communication space DMAP together so that conversation can continue while the music of the performance from the communication space master spatial publishing object is also audible, as well as video of the musicians projected on the walls of the communication space, similar to an actual concert experience. Since communication spaces are customizable, this performance communication space could also have camera angle switching so that users could view multiples camera angles of the band.

Initial user/publisher registration and configuration of a spatial publishing object can involve distributed network form-based publisher input and password selection using software on a client through a portal website running on a remote web server associated with the application software, establishing a publisher account requiring password authentication, to define the searchable, viewable, and listenable attributes of the spatial publishing object, along with any time-stamped media play lists, uniform resource locators, and a channel count, and which process creates a publisher database record to be stored in the master spatial publishing object database on remote database servers, with the addressable location of any and all content to be published on the spatial publishing object, which can be located on remote content servers specifically available to the application should the publisher so decide and execute a content upload or on the publisher's or third party media servers, to be then accessible to clients through the local client application software. Publishing points, or spatial publishing objects, could be created online through a simple form-based database entry transaction in which user data is collected and linked to a new spatial publishing object entry of the form [X, Y, Z]. Updates to spatial publishing object account data can be possible at any time, to be reflected in any currently active SPO spaces drawing on the specific SPO data changed.

While various embodiments of the present invention have been described above, it should be understood that they have been presented by way of example, and not limitation. It can be apparent to persons skilled in the relevant art that various changes in detail can be made therein without departing from the spirit and scope of the invention. Thus the present invention should not be limited by any of the above described exemplary embodiments, but should be defined only in accordance with the following claims and their equivalents.

I claim:

1. A computer-implemented method of communicating comprising:
   providing, by a three-dimensional user interface application executing on a first client computing device and in communication with an application server software module stored on a remote server computing system and associated with at least one spatial publishing object database, a three-dimensional user interface allowing selection of one or more of a plurality of three-dimensional spatial publishing objects retrieved in response to a query from the first client computing device to the remote server computing system, the plurality of three-dimensional spatial publishing objects each comprising a communication space;
   receiving a selection from the first client computing device of a first three-dimensional spatial publishing object of the plurality of three-dimensional spatial publishing objects;
   receiving a selection from a second client computing device to communicate via a first communication space of the first three-dimensional spatial publishing object; and
   displaying audiovisual content in the first communication space within the first three-dimensional spatial publishing object, the audiovisual content viewable on the first client computing device and the second client computing device.

2. The computer-implemented method of claim 1, wherein the plurality of three-dimensional spatial publishing objects retrieved in response to the query are retrieved based upon a common property of the communication space of each of the plurality of three-dimensional spatial publishing objects.

3. The computer-implemented method of claim 1, wherein the selection from the second client computing device to communicate via the first communication space of the first three-dimensional spatial publishing object is made using a pre-defined template.

4. The computer-implemented method of claim 1, wherein an appearance of the first three-dimensional spatial publishing object displayed on the first client computing device is customizable.

5. The computer-implemented method of claim 1, wherein the audiovisual content displayed in the first communication space is simultaneously displayed in an object window on an exterior of the first three-dimensional spatial publishing object.

6. The computer-implemented method of claim 1, wherein an appearance of the first three-dimensional spatial publishing object is one of a picture frame or television-like display frame around its object window.

7. The computer-implemented method of claim 1, wherein control of the audiovisual content from the first communication space is managed in a video control panel for the selection of one of a picture-in-picture setup, a split screen setup, or a setup to track a current speaking or audio-broadcasting spatial publishing object.

8. The computer-implemented method of claim 1, further comprising receiving a selection from the first client computing device to adjust a timeframe of the first communication space to display permissioned and available past content or metadata pertaining to future content.

9. The computer-implemented method of claim 1, wherein the communication space of each of the plurality of three-dimensional spatial publishing objects is one of: (a) a permissioned private communication space, (b) a public communication space, or (c) a private communication space permissioned for a first user and a finite subset of other users.

10. The computer-implemented method of claim 1, wherein the first communication space comprises at least one second three-dimensional spatial publishing object, wherein the at least one second three-dimensional spatial publishing object is one of: a graphical object, binary content, a web link, and a live video feed to a second three-dimensional spatial publishing object associated with the second client computing device.

11. A non-transitory computer-readable medium comprising computer-executable instructions that when executed by a hardware processor perform a method comprising:
providing, by a three-dimensional user interface application executing on a first client computing device and in communication with an application server software module stored on a remote server computing system and associated with at least one spatial publishing object database, a three-dimensional user interface allowing selection of one or more of a plurality of three-dimensional spatial publishing objects retrieved in response to a query from the first client computing device to the remote server computing system, the plurality of three-dimensional spatial publishing objects each comprising a communication space;
receiving a selection from the first client computing device of a first three-dimensional spatial publishing object of the plurality of three-dimensional spatial publishing objects;
receiving a selection from a second client computing device to communicate via a first communication space of the first three-dimensional spatial publishing object; and
displaying audiovisual content in the first communication space within the first three-dimensional spatial publishing object, the audiovisual content viewable on the first client computing device and the second client computing device.

12. The non-transitory computer-readable medium of claim 11, wherein the plurality of three-dimensional spatial publishing objects retrieved in response to the query are retrieved based upon a common property of the communication space of each of the plurality of three-dimensional spatial publishing objects.

13. The non-transitory computer-readable medium of claim 11, wherein the selection from the second client computing device to communicate via the first communication space of the first three-dimensional spatial publishing object is made using a pre-defined template.

14. The non-transitory computer-readable medium of claim 11, wherein an appearance of the first three-dimensional spatial publishing object displayed on the first client computing device is customizable.

15. The non-transitory computer-readable medium of claim 11, wherein the audiovisual content displayed in the first communication space is simultaneously displayed in an object window on an exterior of the first three-dimensional spatial publishing object.

16. The non-transitory computer-readable medium of claim 11, wherein an appearance of the first three-dimensional spatial publishing object is one of a picture frame or television-like display frame around its object window.

17. The non-transitory computer-readable medium of claim 11, wherein control of the audiovisual content from the first communication space is managed in a video control panel for the selection of one of a picture-in-picture setup, a split screen setup, or a setup to track a current speaking or audio-broadcasting spatial publishing object.

18. The non-transitory computer-readable medium of claim 11, wherein the method further comprises receiving a selection from the first client computing device to adjust a timeframe of the first communication space to display permissioned and available past content or metadata pertaining to future content.

19. The non-transitory computer-readable medium of claim 11, wherein the communication space of each of the plurality of three-dimensional spatial publishing objects is one of: (a) a permissioned private communication space, (b) a public communication space, or (c) a private communication space permissioned for a first user and a finite subset of other users.

20. The non-transitory computer-readable medium of claim 11, wherein the first communication space comprises at least one second three-dimensional spatial publishing object, wherein the at least one second three-dimensional spatial publishing object is one of: a graphical object, binary content, a web link, and a live video feed to a second three-dimensional spatial publishing object associated with the second client computing device.

* * * * *